(12) United States Patent
Holliday

(10) Patent No.: US 10,739,932 B2
(45) Date of Patent: Aug. 11, 2020

(54) SYSTEMS AND METHODS FOR INTERACTIVE MOBILE ELECTRONIC CONTENT CREATION AND PUBLICATION

(71) Applicant: Semi-Linear, Inc., New York, NY (US)

(72) Inventor: Linda M. Holliday, New York, NY (US)

(73) Assignee: Semi-Linear, Inc., New York, NY (US)

( * ) Notice: Subject to any disclaimer, the term of this patent is extended or adjusted under 35 U.S.C. 154(b) by 1570 days.

(21) Appl. No.: 13/650,102

(22) Filed: Oct. 11, 2012

(65) Prior Publication Data

US 2013/0275891 A1 Oct. 17, 2013

Related U.S. Application Data

(60) Provisional application No. 61/545,585, filed on Oct. 11, 2011, provisional application No. 61/561,827, filed on Nov. 18, 2011, provisional application No. 61/652,851, filed on May 29, 2012, provisional application No. 61/652,853, filed on May 30, 2012.

(51) Int. Cl.
    *G06F 3/048* (2013.01)
    *G06F 3/0483* (2013.01)
    *G06F 3/0488* (2013.01)

(52) U.S. Cl.
    CPC ............ *G06F 3/048* (2013.01); *G06F 3/0483* (2013.01); *G06F 3/04883* (2013.01)

(58) Field of Classification Search
    CPC ..... G06F 3/0483; G06F 3/048; G06F 3/04883
    See application file for complete search history.

(56) References Cited

U.S. PATENT DOCUMENTS

| | | | | |
|---|---|---|---|---|
| 5,060,135 | A | * | 10/1991 | Levine ............... G06F 3/04817 715/769 |
| 5,761,485 | A | * | 6/1998 | Munyan ...................... 715/839 |
| 5,772,446 | A | * | 6/1998 | Rosen ...................... 434/307 R |
| 7,725,565 | B2 | * | 5/2010 | Li ........................ G06Q 10/067 709/219 |
| 9,519,624 | B1 | * | 12/2016 | Genoni ................. G06F 40/106 |
| 2002/0184189 | A1 | * | 12/2002 | Hay et al. ........................ 707/1 |
| 2003/0076352 | A1 | * | 4/2003 | Uhlig et al. .................. 345/738 |
| 2004/0039750 | A1 | * | 2/2004 | Anderson et al. ........ 707/103 R |
| 2005/0138056 | A1 | * | 6/2005 | Stefik .................. G06F 16/3328 |
| 2005/0283742 | A1 | * | 12/2005 | Gusmorino ......... G06F 3/04817 715/839 |
| 2006/0200466 | A1 | * | 9/2006 | Kaasten ................ G06F 16/284 |
| 2006/0229097 | A1 | * | 10/2006 | Flynt .................. H04M 1/2745 455/551 |
| 2006/0242121 | A1 | * | 10/2006 | DeVorchik ........ G06F 17/30126 |
| 2006/0268100 | A1 | * | 11/2006 | Karukka ............... G06F 3/0482 348/14.01 |

(Continued)

*Primary Examiner* — Nicholas Klicos

(57) ABSTRACT

Existing content such as books are reorganized and condensed as electronic books for display on a mobile computing device. The electronic books have a hierarchical structure. A user interacts with the content of the book by way of a touch screen of the mobile computing device. The navigation may be non-linear in nature and the book is reconstructed as a set of primary ideas, supporting ideas, stacks of cards for the supporting ideas, and individual cards comprising elements and commentary from or about the book.

14 Claims, 41 Drawing Sheets

(56) References Cited

U.S. PATENT DOCUMENTS

| | | | | |
|---|---|---|---|---|
| 2006/0271867 A1* | 11/2006 | Wang | G06F 3/0482 | 715/764 |
| 2007/0055670 A1* | 3/2007 | Maycotte | G06F 16/353 | |
| 2007/0154876 A1* | 7/2007 | Harrison, Jr. | | 434/365 |
| 2007/0186186 A1* | 8/2007 | Both | G06F 3/04817 | 715/821 |
| 2008/0209329 A1* | 8/2008 | DeFranco | G06Q 10/00 | 715/733 |
| 2008/0227074 A1* | 9/2008 | Johnson | | 434/307 R |
| 2010/0050086 A1* | 2/2010 | Sherrard | G06F 3/04817 | 715/739 |
| 2010/0162173 A1* | 6/2010 | Schmitlin | G06Q 10/10 | 715/853 |
| 2011/0066951 A1* | 3/2011 | Ward-Karet | H04L 43/0894 | 715/744 |
| 2011/0066965 A1* | 3/2011 | Choi | | 715/776 |
| 2011/0247017 A1* | 10/2011 | Hopkins | G06F 17/30283 | 719/328 |
| 2012/0191708 A1* | 7/2012 | Barsony | G06Q 10/00 | 707/737 |
| 2012/0246207 A1* | 9/2012 | Evans | G06F 17/30126 | 707/829 |
| 2013/0174179 A1* | 7/2013 | Park | G06F 9/4843 | 718/107 |
| 2014/0040817 A1* | 2/2014 | Sakamoto | G06F 3/0481 | 715/788 |
| 2014/0157199 A1* | 6/2014 | Kahler | G06Q 30/0267 | 715/833 |
| 2014/0207776 A1* | 7/2014 | Harris | G06Q 10/10 | 707/737 |
| 2015/0205797 A1* | 7/2015 | Leventhal | G06F 40/106 | 707/748 |
| 2016/0050165 A1* | 2/2016 | Thomas | G06F 3/04855 | 715/752 |

\* cited by examiner

FIG. 3

CMS
K2 Detailed View

CMS
K3 Detailed View

K3 = { K4.1, K4.2, K4.3 ... }

Front of Card designated K4.3

CMS
Front of Card
Detailed View

Back of Card

CMS
BACK of Card
Detailed View

SYSTEMS AND METHODS FOR INTERACTIVE MOBILE ELECTRONIC CONTENT CREATION AND PUBLICATION

This application claims the benefit of the following Provisional U.S. Patent applications, all of which are hereby incorporated by reference: 61/545,585 filed on Oct. 11, 2011; 61/561,827 filed on Nov. 18, 2011; 61/652,851 filed on May 30, 2012; and 61/652,853 filed on May 30, 2012.

BACKGROUND

Prior art publications, such as books, generally comprise text and images which are, for the most part unstructured or, if in electronic format, include only the most basic structure such as bibliographic information, chapters, an index, and so forth. If a publication is in paper form, the publication may be scanned and stored in an electronic readable format, such as through optical character recognition.

When a book is converted or authored in electronic form it is presently limited in how the book is structured or organized. However, once in a computer readable format, the book consists of images with underlying textual data and it becomes searchable, as in the case of an e-book. Such e-books are widely available online and can be downloaded and read on a number of electronic devices such as an Apple iPad, Amazon Kindle, Barnes & Noble Nook, tablet computers running an Android operating system (OS), laptop computers, desktop computers, and the like.

When referring to the aforementioned prior art publications, the use of the terms "unstructured" or "basic structure" herein means that the publications consist of the actual creative content of the publication and conventional metadata ("conventional metadata"). Examples of conventional metadata includes a chapter listing, an index, an appendix, names of authors, editors, and contributors, owner of the copyright, year of the copyright, numeric or alphanumeric codes such as an international standard book number ("ISBN") for finding information in the book, and so forth.

An electronic book such as any of those mentioned above by way of example provide a more flexible reading experience for the user. Such e-books also benefit authors, publishers, and sellers in that an electronic book can be sold electronically (e.g. via a web site or mobile electronic device), can include copyright controls, can more accurately account for sales and apply royalties, and so forth.

So, while electronic books provide some features such as quick searching, they remain limited in many of the ways that printed books are; they are static publications. Thus, a need presently exists for systems and methods for interactive mobile electronic content creation and publication.

SUMMARY

Existing content such as books are reorganized and condensed as electronic books for display on a mobile computing device. The electronic books have a hierarchical structure. A user interacts with the content of the book by way of a touch screen of the mobile computing device. The navigation may be non-linear in nature and the book is reconstructed as a set of primary ideas, supporting ideas, stacks of cards for the supporting ideas, and individual cards comprising elements or commentary from or about the book.

BRIEF DESCRIPTION OF THE DRAWINGS

FIG. 3 is a screenshot from a mobile computing device showing an exemplary summary of the primary idea of FIG. 2 that is displayed when selected by a user.

DETAILED DESCRIPTION

The present disclosure provides teachings for those involved in the processes and systems in the authoring, editing, publishing, and selling publications to reorganize and condense existing content and new content in the form of a a digital book ("digital book" or "e-book" or "electronic book" or "electronic content").

More specifically, when applied to existing content such as non-fiction books, efficiently result in a card-based electronic publication. This resulting publication is made available for free and/or for sale in whole and in part. For example, a stack of cards that are relevant, accurate, condensed, and useful to a reader ("reader" or "user") may be purchased by a user with the stack comprising information and media from many books yet still having the reading flow and consistency as if the e-book was written by a single author.

Figure 1:
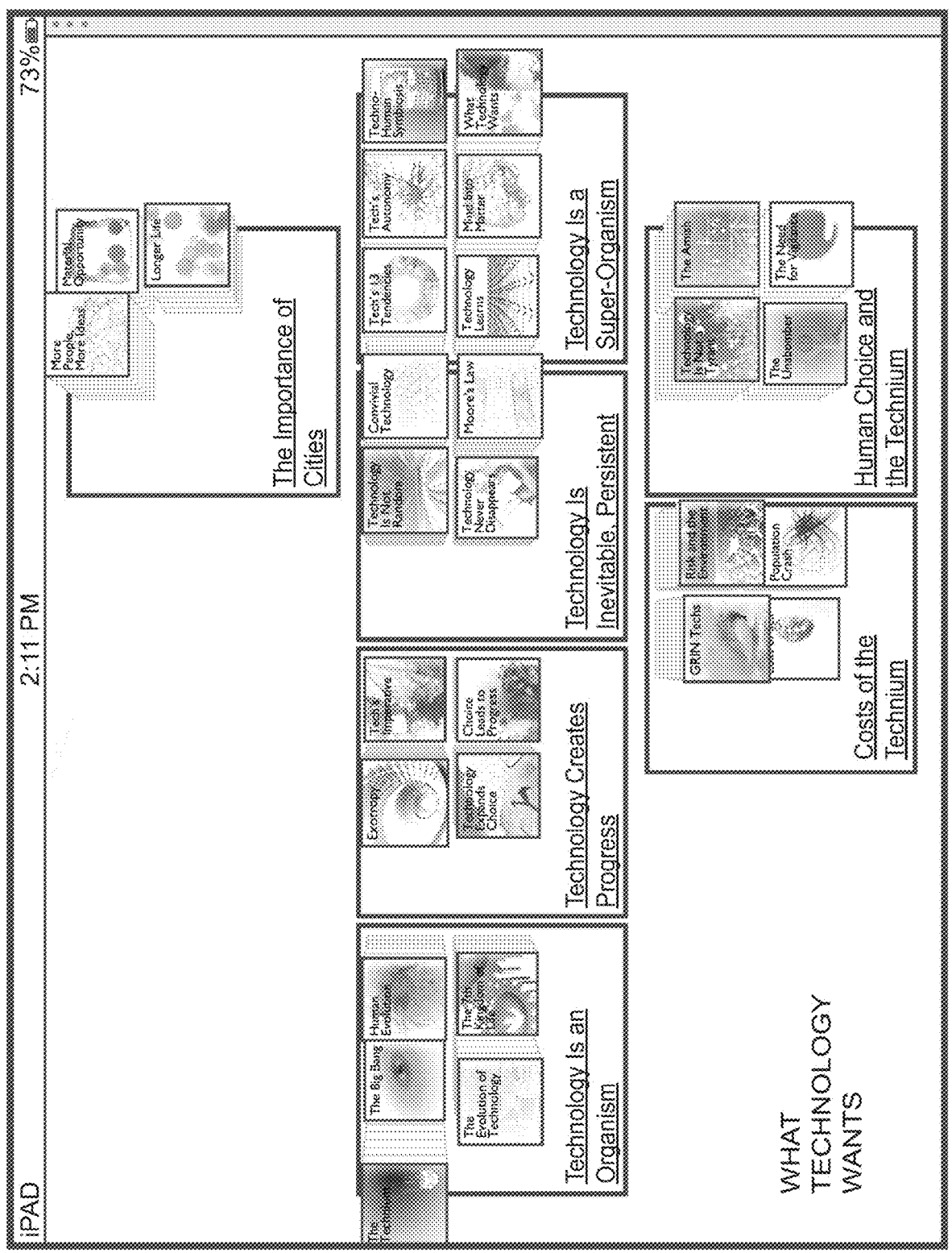
FIG. 1 is a screenshot from a mobile computing device showing a lengthy and complex non-fiction book reorganized into seven primary ideas, each comprising stacks of cards that represent supporting ideas and each card of each stack comprising excerpts and material from the book reorganized to be concise read fluidly from card to card.

Though the present disclosure mentions and shows non-fiction book content, it is appreciated that the methods and systems disclosed herein are also for any type of content included, but not limited to, fictional books, magazines, news, video, audio, music, film, audiovisual works, multimedia creations, animations, conference proceedings, poems, newspapers, diaries, textbooks, educational works, computer code that causes a processor of a computer to modify the display of the computer to display the reorganized and/or condensed content As applied to a single book a non-fiction book having several hundred pages can be deconstructed into a thesis. In one example to follow, the 400 non-fiction book "What Technology Wants" by Kevin Kelly is deconstructed and reorganized into seven topics ("primary ideas"). Each primary idea is supported by supporting ideas represented by a stack of cards. FIG. 1 shows these seven ideas which were identified through processes and methods disclosed below. This view is sometimes referred to herein as "FGV" or Full Glyph View.

More specifically, FIG. 1 is a screenshot from a tablet computing device (an IPAD) showing the book "What Technology Wants" reorganized into seven primary ideas: 1) The Importance of Cities; 2) Technology Is an Organism; 3) Technology Creates Progress; 4) Technology Is a Super Organism; 5) Costs of the Technium; and 6) Human Choice and the Technium.

Each primary idea comprises a plurality of stacks of cards. Each stack of cards is a supporting idea that teaches or argues in favor of its primary stack. that represent supporting ideas and each card of each stack comprising excerpts and material from the book reorganized to be concise read fluidly from card to card.

Figure 2:
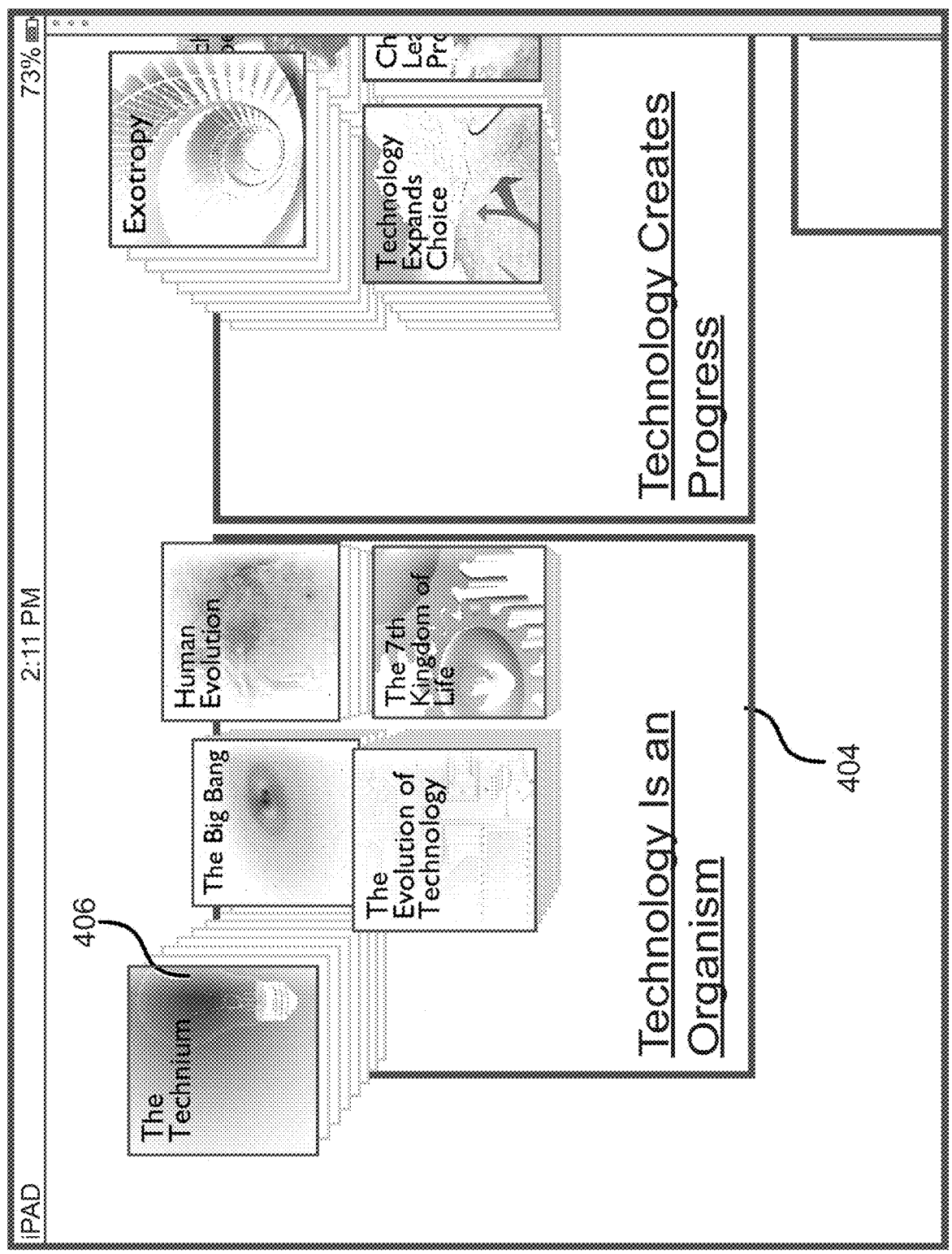
FIG. 2 is a screenshot from a mobile computing device of one exemplary primary idea in a zoomed glyph view.

For example, FIG. 2 is a screenshot from a mobile computing device zoomed in to better illustrate the primary ideas, supporting ideas, and stacks of cards. The zoomed view is referred to herein as "ZGV" for Zoomed Gyph View. In this example, the primary idea is "Technology Is an Organism" and supported by five stacks supporting ideas: 1) The Technium 406; 2) The Big Bang; 3) Human Evolution; 4) The Evolution of Technology; and 5) The 7$^{th}$ Kingdom of Life. The transition from FGV to ZGV is smooth and animated in perspective to simulate a three dimensional environment.

Note in both FIGS. 1 and 2, the information is additionally organized and displayed as a 3-dimensional manner. This 3D interface conveys additional information, for example not that the stacks are different in height representing, for example the preponderance of support for the various ideas. In this way, the constraining pagination and linear makeup of the prior art book is removed allowing a reader to explore concepts and ideas they find interesting though the the material, information, arguments, readability, arguments of the prior art book are uniquely preserved.

In one example, the 3D interface shown and described herein is made for a mobile device having a touchscreen, such as an iPad or other tablet computing device. Those having ordinary skill in the art will appreciate that that it is difficult or impossible to convey the dynamic nature and visual impact of the animations and user interface (UI) available on such devices by way of the figures herein which have are static and have specific and constraining requirements. Those having ordinary skill in the art will also appreciate that any and all manners of animations, transitions, swiping actions, UI elements and feature, and the like are available in rendering, displaying, and transitioning between and among the various screenshots of the figures.

Figure 3:
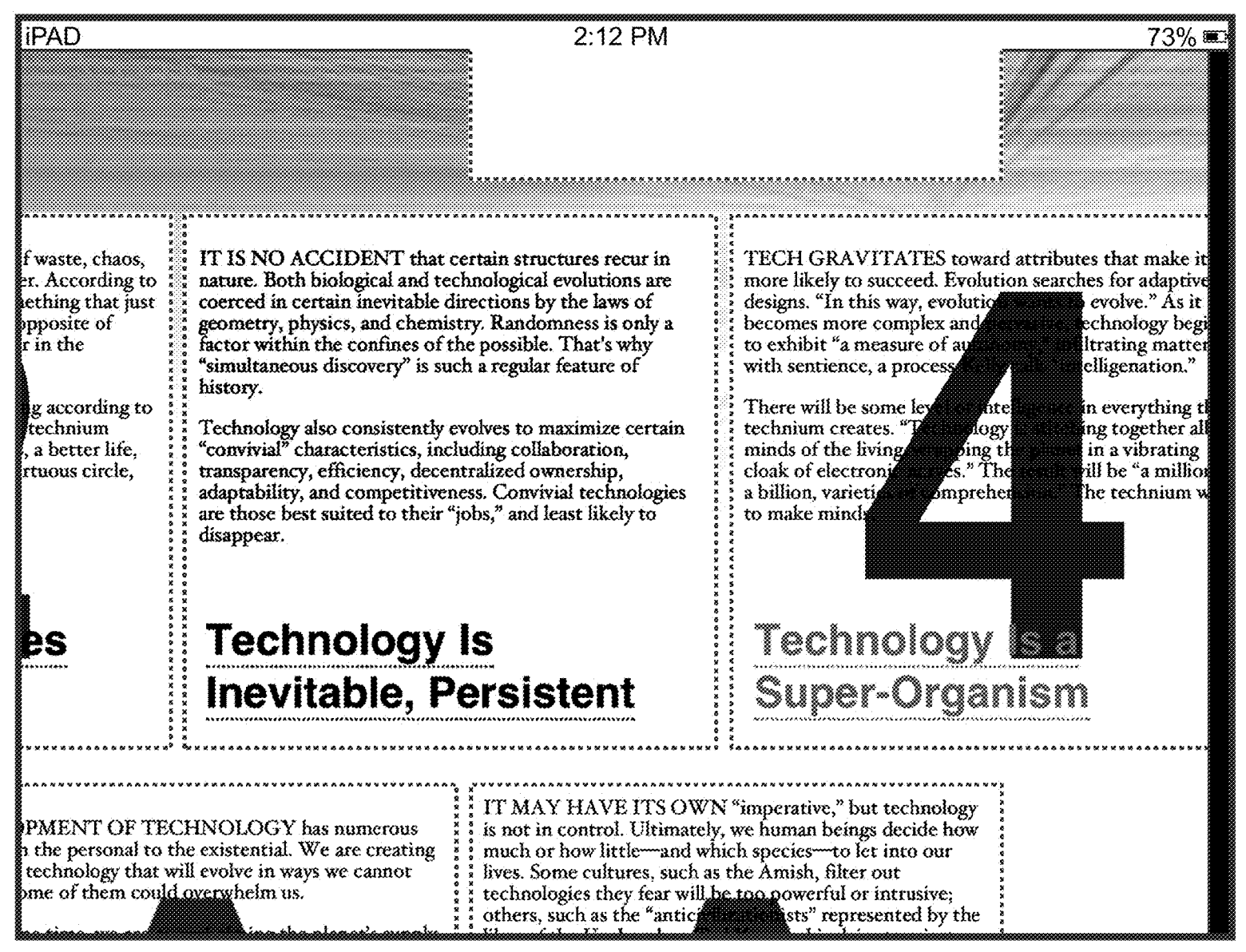

FIG. 3 is a screenshot from a mobile computing device showing an exemplary summary of the primary idea of FIG. 2 that is displayed when selected by a user. In the zoomed glyph view of FIG. 2, the user touches the title, there is a smooth transition from the primary idea with its stacks of cards rendered in a 3D perspective view to the summary. Tapping on the summary smoothly transitions back to the ZGV showing the title and stacks of cards with 3D perspective rendering.

Figure 4:
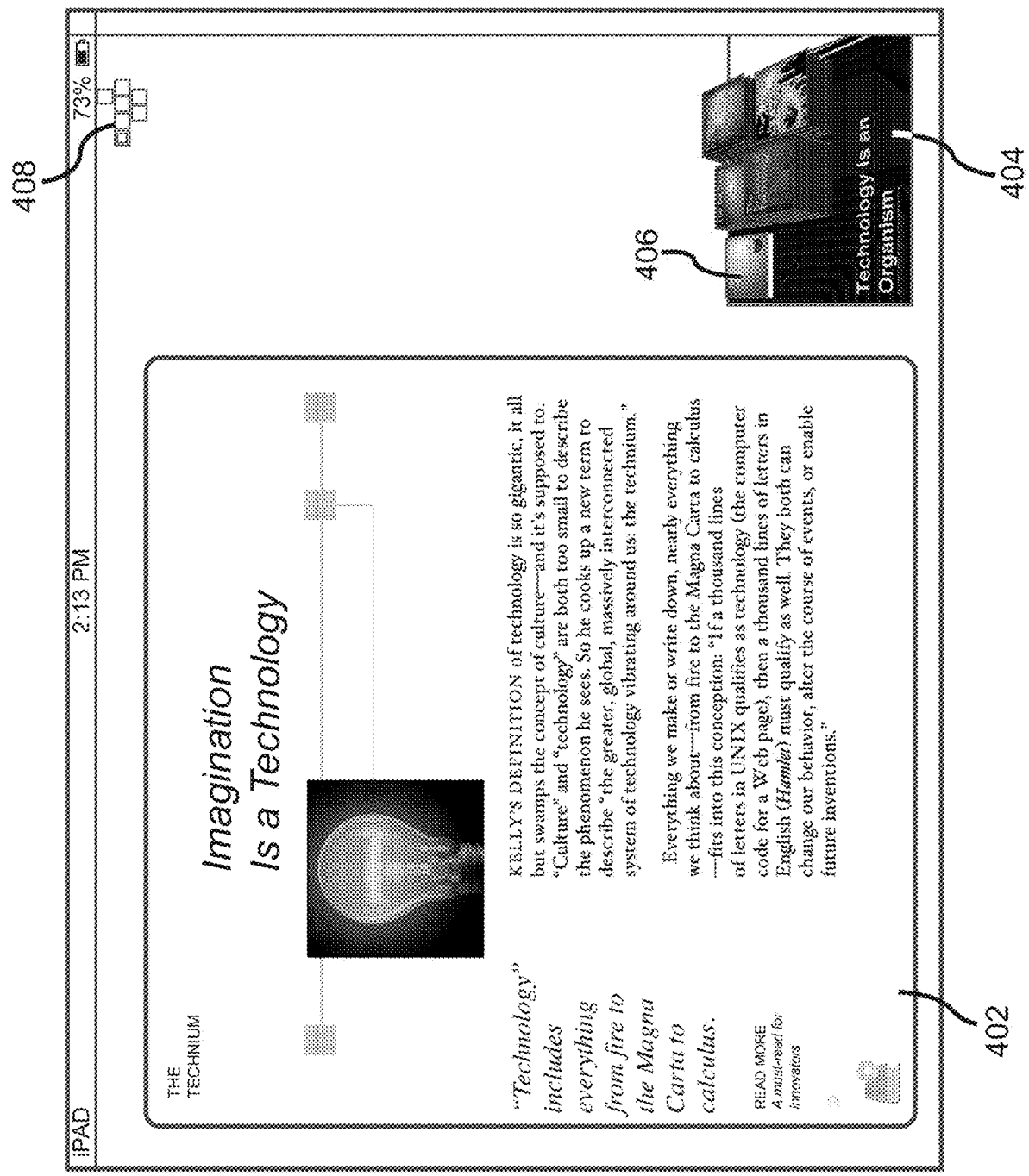
FIG. 4 is a screenshot from a mobile computing device showing an exemplary card and a glyph.

FIG. 4 is a screenshot from a mobile computing device showing an exemplary card 402 that is displayed when a user taps on a supporting idea, that is, a deck of cards 406. Upon tapping a deck of cards 406, the zoomed glyph view smoothly shrinks in size, falling into the position shown in 406 of FIG. 4, the glyph view. As this happens, the first card and the ones beneath it rise from the deck 406 in a delightful arc. This position is referred to herein as the "reading position" and includes the card 402 and glyph 404. Also shown is mini-glyph 408 which is a navigational icon that shows the user, in a reading position, where they are. In various embodiments, mini-glyph has additional functions such as allowing the user to navigate to a different card, glyph, view, and the like by tapping on the mini-glyph.

The first card of the deck can be read and any other content, such as video, played or otherwise manipulated by the user. The user can swipe the card towards the glyph causing it to fall gently and be stacked and displaying the card beneath it. The user can navigate back and forth between cards.

Figure 5:
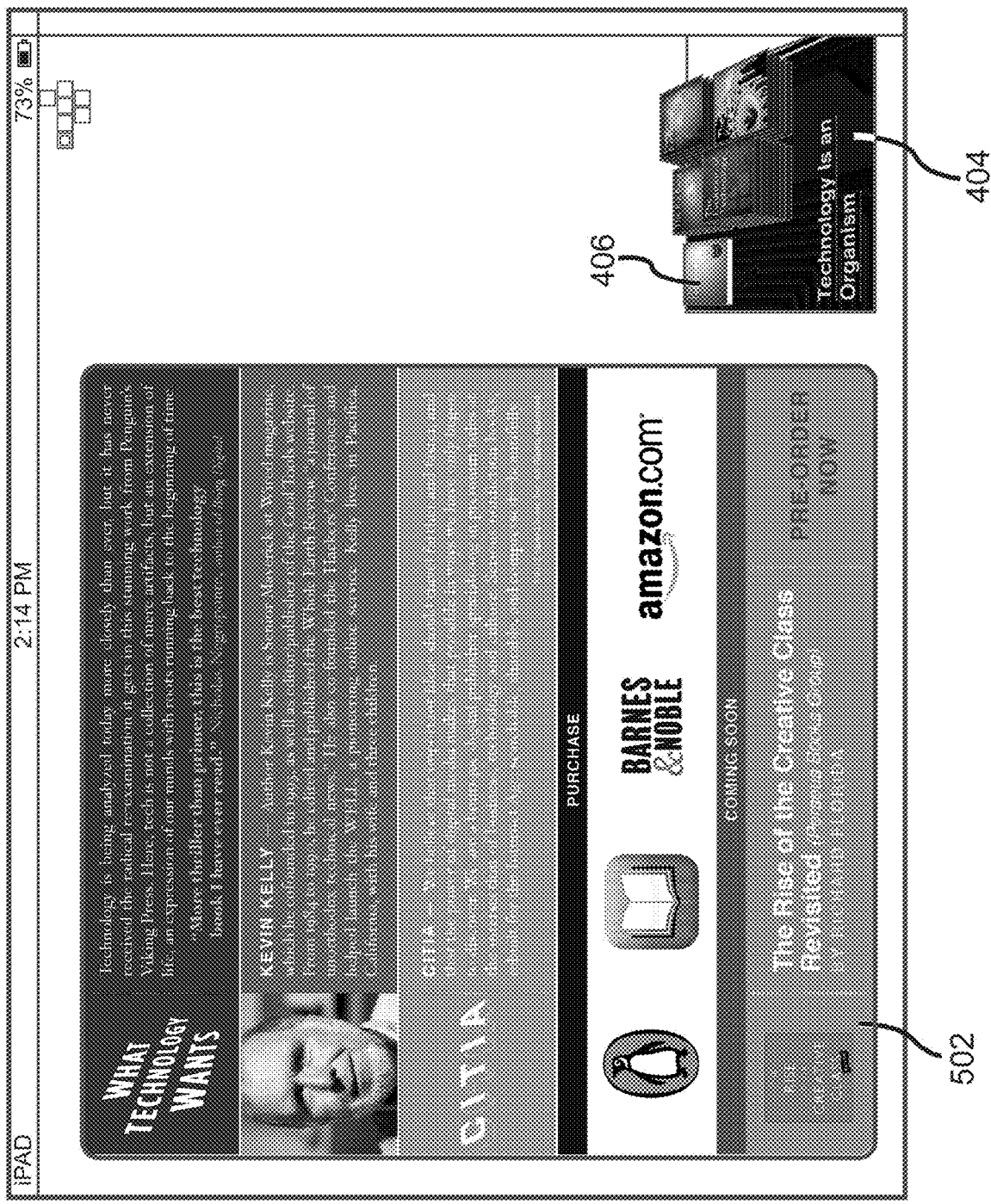
FIG. 5 is a screenshot from a mobile computing device showing the back of an exemplary card.

FIG. 5 is a screenshot from a mobile computing device showing the back of an exemplary card. Each card may have the same or may have different back side. The back side of the card comprises additional information. By way of example, some of the additional information may include information about the author, the publisher, similar books, special offers, advertisements, widgets and applets having any function possible by those having skill in the art. The back of the card may also include an e-commerce section such as links to purchase the book or other items. In another implementation, the card has more than two sides to display even more information or UI elements.

In the reading position, a card can be flipped by the user from front to back (from 402 of FIG. 4 to 502 of FIG. 5) or back to front (from 502 of FIG. 5 to 402 of FIG. 4) or, for cards having more than two sides, from one side to any of the other sides, in a nearly limitless number of ways depending on where the user touches the card and how the user moves his/her finger.

Without limitation, some examples of user actions and their results are disclosed in the Table 1 below. The term "rising edge" refers to when a user touches the screen with a finger and the term "falling edge" refers to when the user removes the finger from the screen. Between the rising edge and falling edge, the user's finger remains in contact with screen and can remain stationary or move.:

TABLE 1

| Action | Result |
| --- | --- |
| In the reading position (FIGS. 4 and 5), the user touches any part of the card 402, and swipes down at an angle of less than 45 degrees in either direction from the center vertical axis of the card. | On the rising edge, the card is dragged. The card moves in the direction of and at the same speed of the finger. At the falling edge, the card begins to flip around the center horizontal axis of the card while at the same time making a planar transition back to the stable reading position shown in FIGS. 4 and 5. The card rotates around the horizontal axis with the bottom of the card moving up and towards the user and the top of the card |

TABLE 1-continued

| Action | Result |
| --- | --- |
| | moving down and away from the user. The full flip and planar movement back to the stable reading position conclude at the same time. From the falling edge to the flipped stable reading position, the process takes around $4/10^{th}$ of a second. That approximate amount of time presents a pleasing animation but is fast enough so as not to frustrate the user. |
| In the reading position (FIG. 4), the user quickly taps any part of the card 402. A quick tap is approximately less than $5/10^{th}$ of a second. | On the falling edge, the card the card shrinks in size while smoothly falling in an arc-like motion towards the deck that the card belongs to 406. As the card 402 approaches or reaches the deck 406 it is transitions from a plan view of the card to a perspective view that aligns with the perspective rendering of the glyph 404 and more specifically the deck 406. The deck grows in height with each card added (and shrink in height with each card removed into the reading position 402). |
| In the reading position (FIG. 4), the user touches any part of the card 402 and slides his/her finger towards the right and within ±45 degrees from an imaginary horizontal line originating from and moving with the user's finger on the screen. | On the rising edge and in proportion to how far the user's finger has moved, the card shrinks in size and smoothly moves in an arc-like motion towards the deck 406. The shrinking and motion is in relation to the position of the user's finger. As the user's finger meets approximately the rightmost boundary of the screen the card is returned to the deck 406 as described in the row above. If the user's finger is removed, the card falls as described in the row above, except it's descent originates at the falling edge. As the card 402 approaches or reaches the deck 406 it is transitions from a plan view of the card to a perspective view that aligns with the perspective rendering of the glyph 404 and more specifically the deck 406. If the user's finger moves to the left after moving to the right, the card grows in size and moves up in the arc-like motion towards the card presently (partially visible) in the reading position. When the card under the user's finger reaches approximately its initial reading position and when on the falling edge, the card remains in the reading position 402. |
| In the reading position, swipe the card right within ±45 degrees from an imaginary horizontal line originating from and moving with the user's finger on the screen. | On the rising edge the card moves with the finger and is reduced in size in proportion to how close the finger is to the rightmost edge of the screen. On the falling edge of the swipe, the card falls back to its deck 406. |
| In the reading position, swipe the card left within ±45 degrees from an imaginary horizontal line originating from and moving with the user's finger on the screen. | The card moves horizontally with the finger and moves partially off of the screen towards the left. On the falling edge next card in the deck 406 rises in an arc-like path towards the reading position 402 while growing in size until it reaches the stable reading position. Note, if the card is the first card of the deck 406 and in position 402, the left swipe causes the card to move with the finger while partially revealing the card beneath. If the finger reaches the leftmost edge of the screen, the card moves horizontally back to the stable reading position. |

Figure 6:
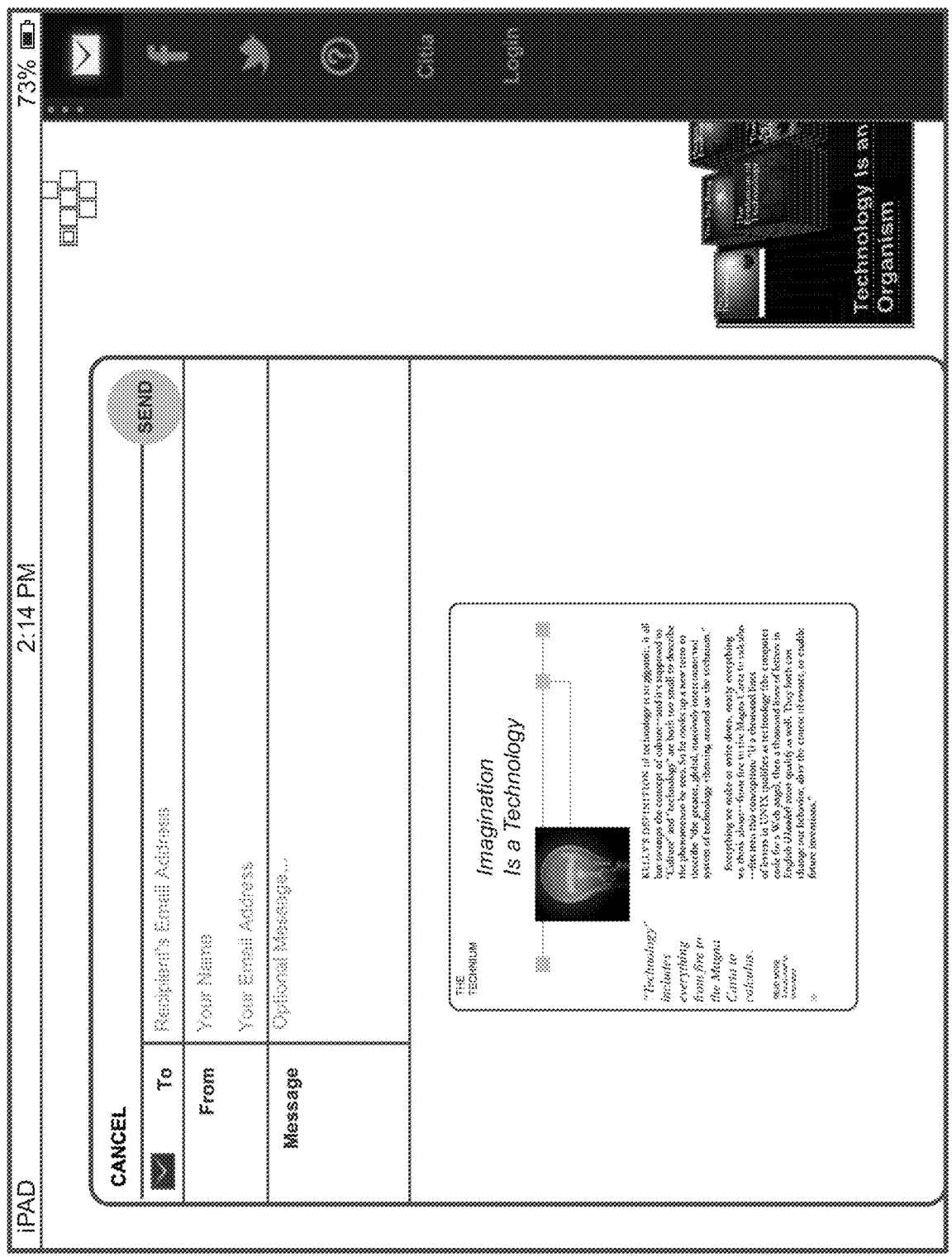
FIG. 6 is a screenshot from a mobile computing device of a card being shared.

Depending on the configuration, for example settings defined by the publisher, individual cards, sets of cards, decks, or any combination of any of the elements of the books can be electronically shared with others. FIG. 6 show a card being shared via email. Cards may be shared by any means, such as by way of social network sites like Facebook, Twitter, Pinterest, and the like. Once shared, for example on Facebook, the cards may be shared again by any electronic means and on any electronic medium. In some configurations, cards, deck, and other elements or combination of elements of the book may be embedded in other websites and online stores, including the animations disclosed above.

Other views and configurations are possible and too numerous to mention. With this disclosure, those skilled in the art will begin to appreciate the multitude of functional and creative ways to display a book reorganized in the hierarchical manner disclosed above (i.e. the book displayed with a plurality of primary ideas, and each primary idea comprising a supporting idea represented by a deck of cards, and each deck of cards expandable to view the card's content).

Figure 7:
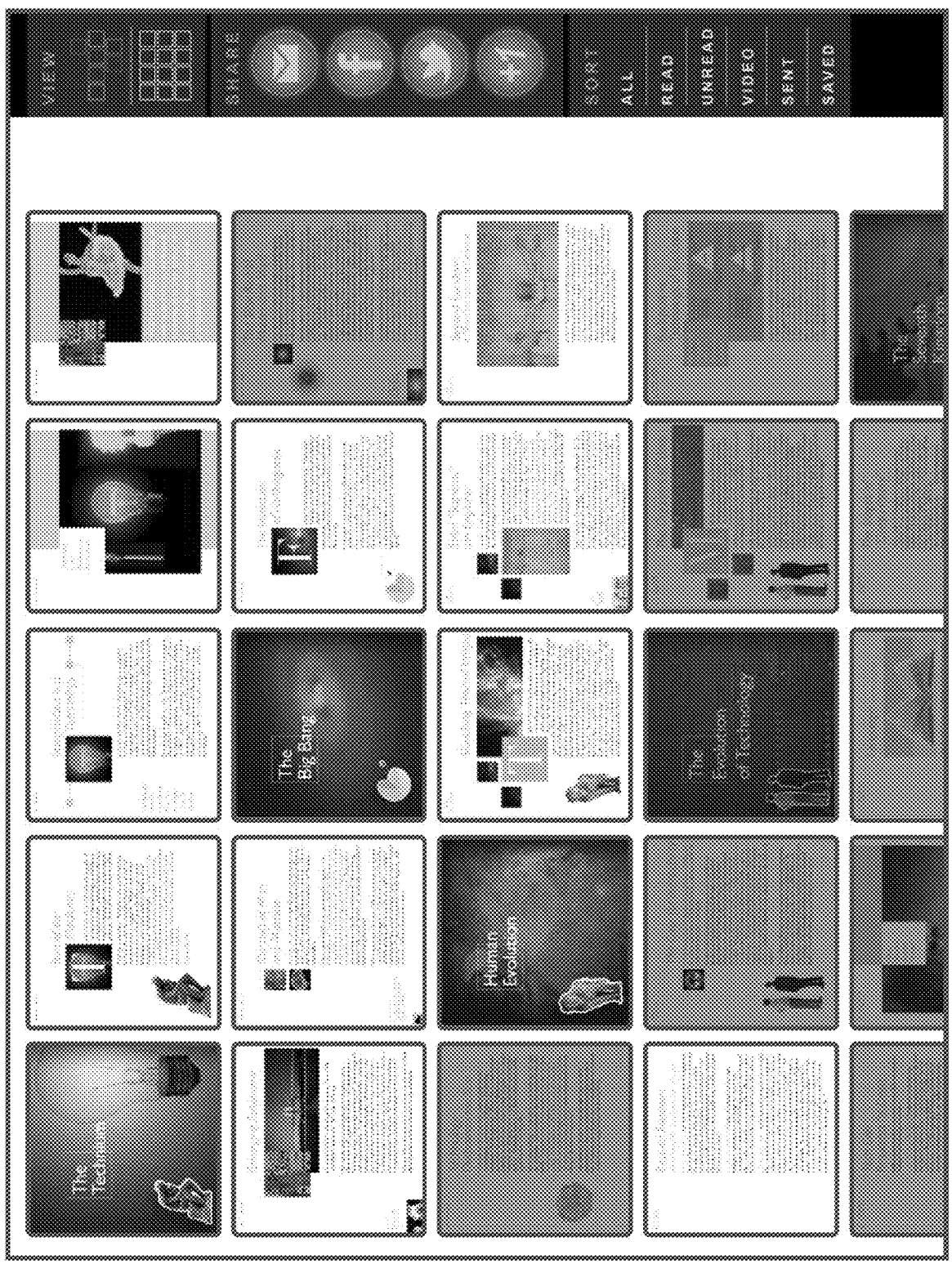
FIG. 7 illustrates a grid view of cards.
Figure 8:
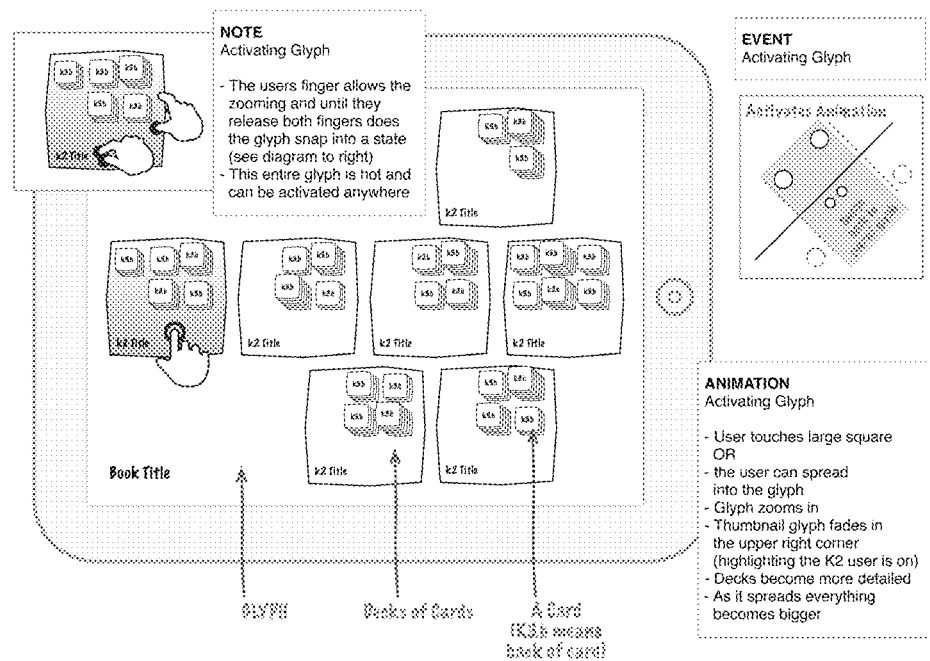
FIGS. 8-31 illustrate exemplary user interactions with information displayed on a mobile computing device in landscape mode.
Figure 9:
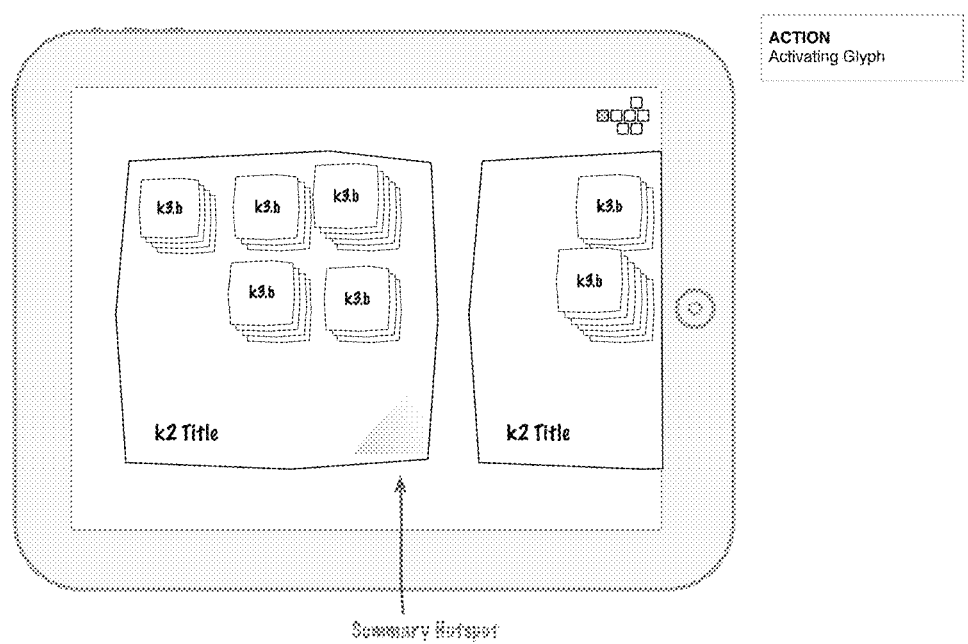
Figure 10:
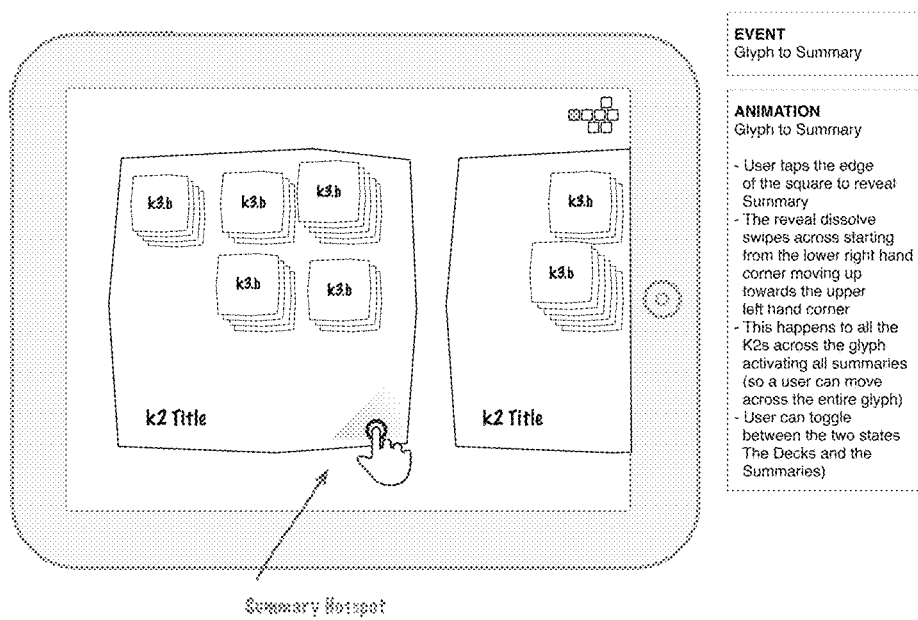
Figure 11:
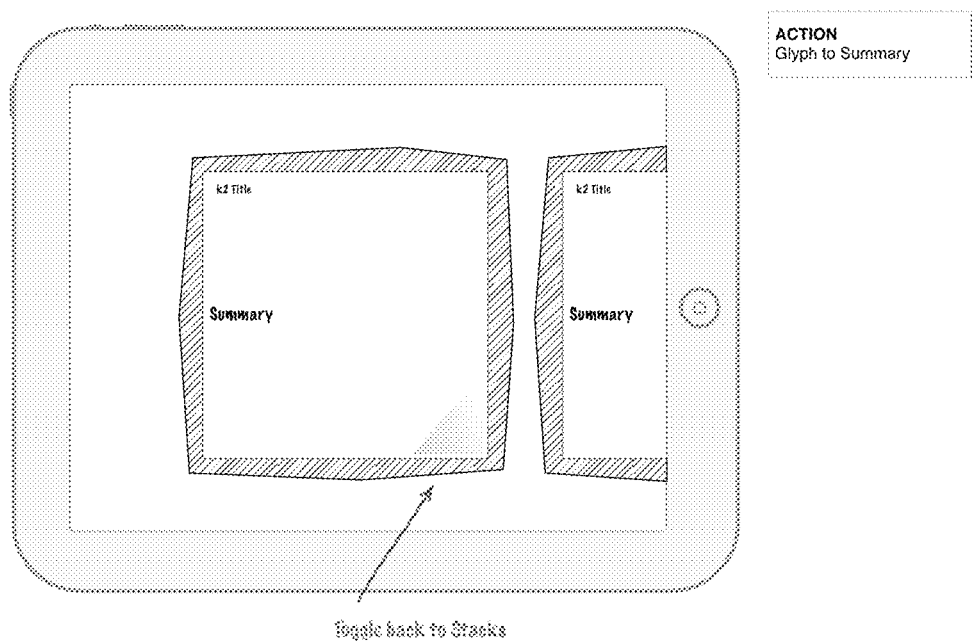
Figure 12:
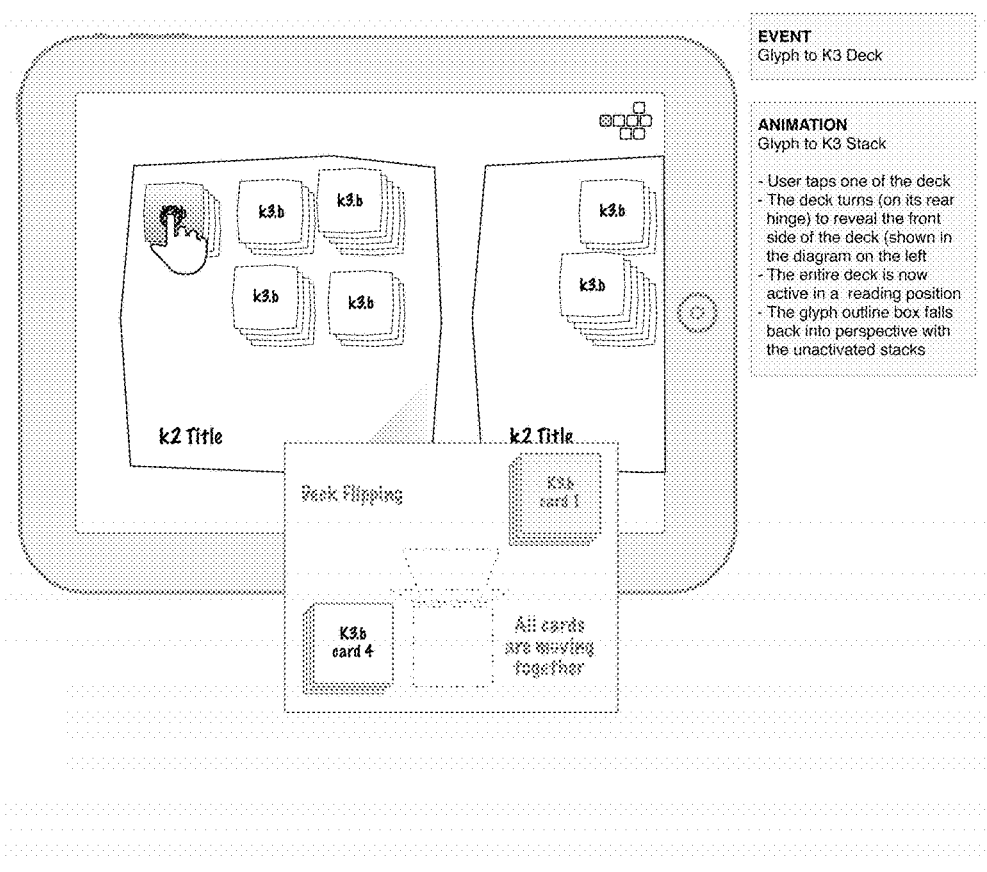
Figure 13:
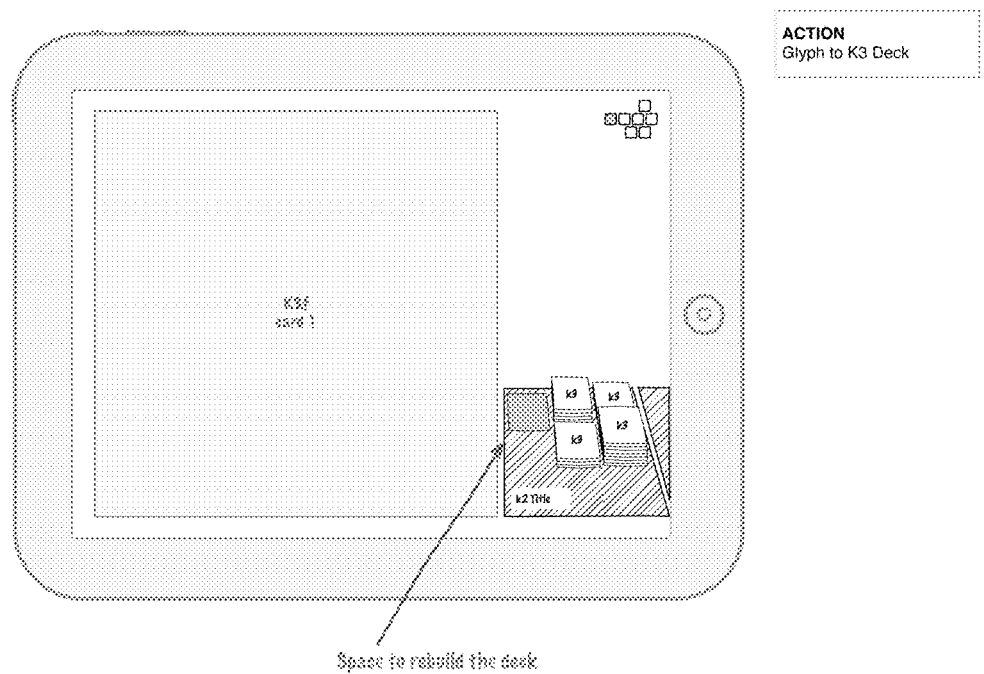
Figure 14:
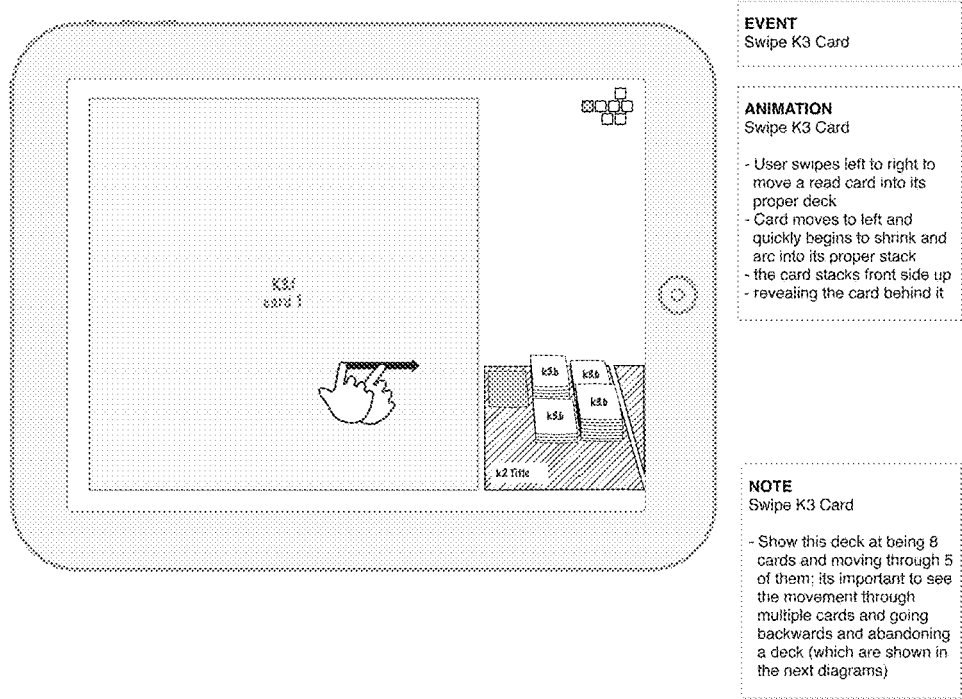
Figure 15:
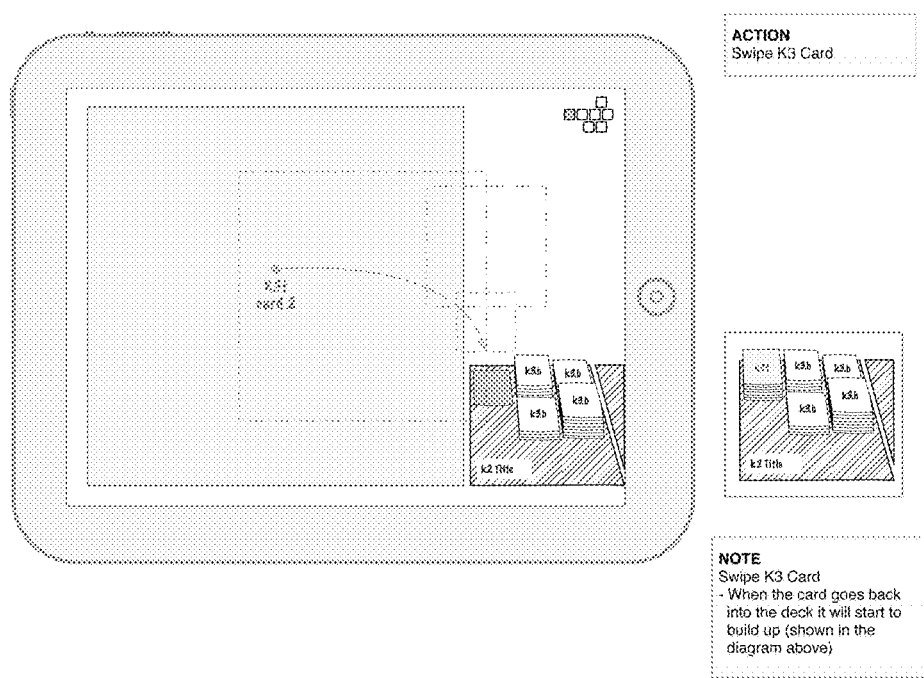
Figure 16:
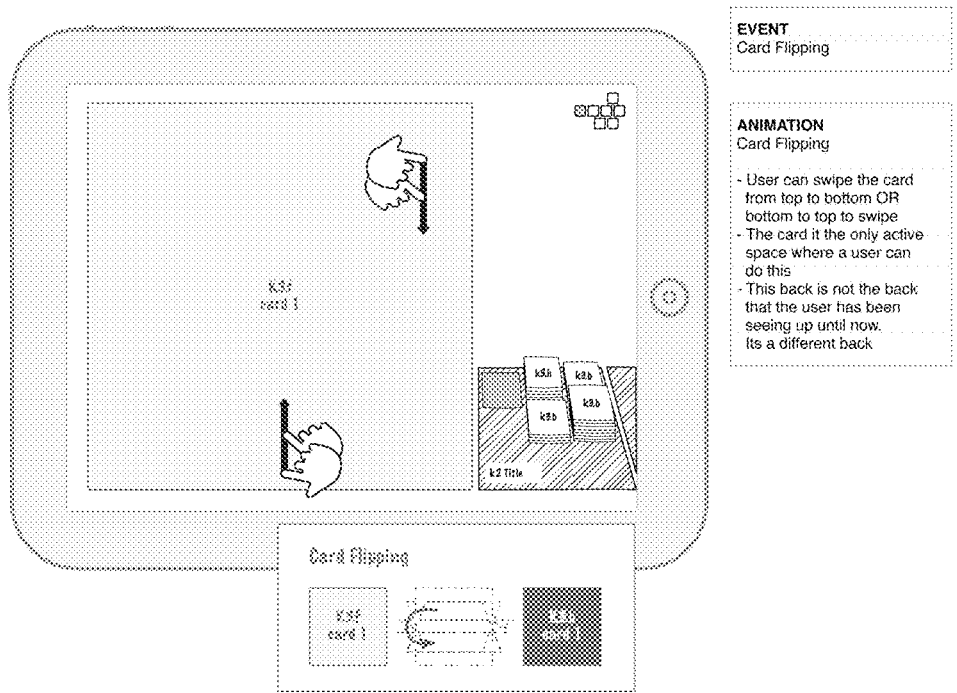
Figure 17:
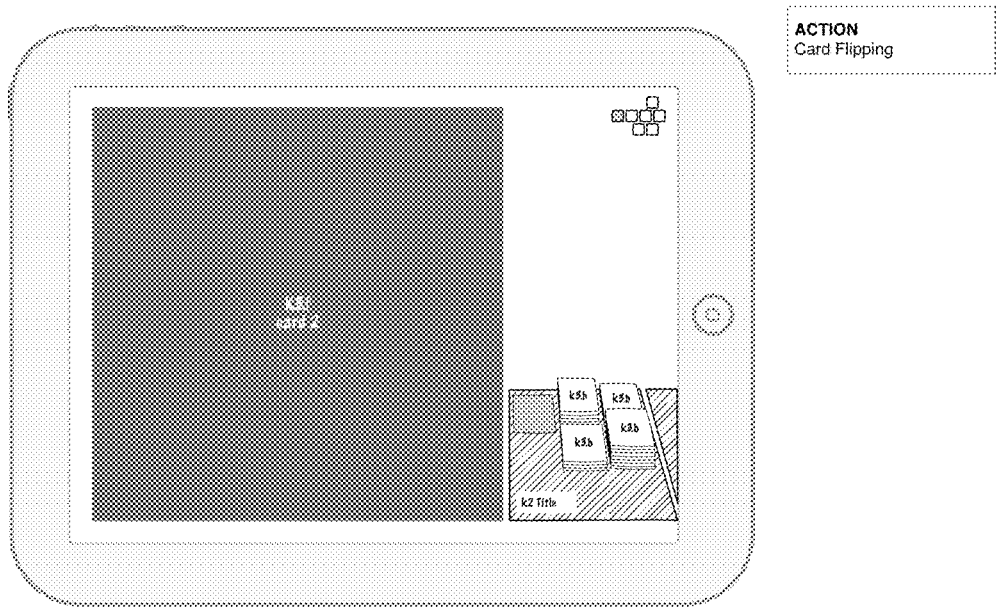
Figure 18:
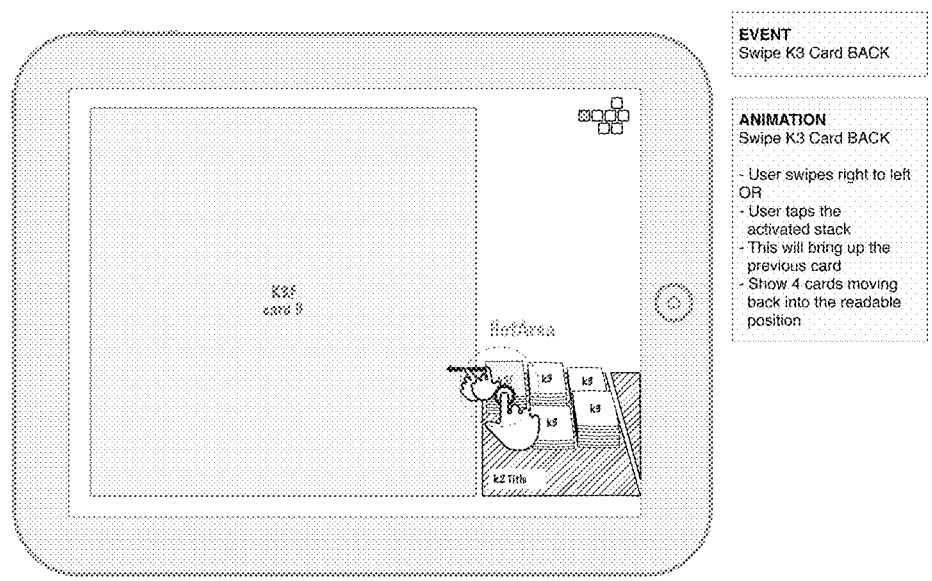
Figure 19:
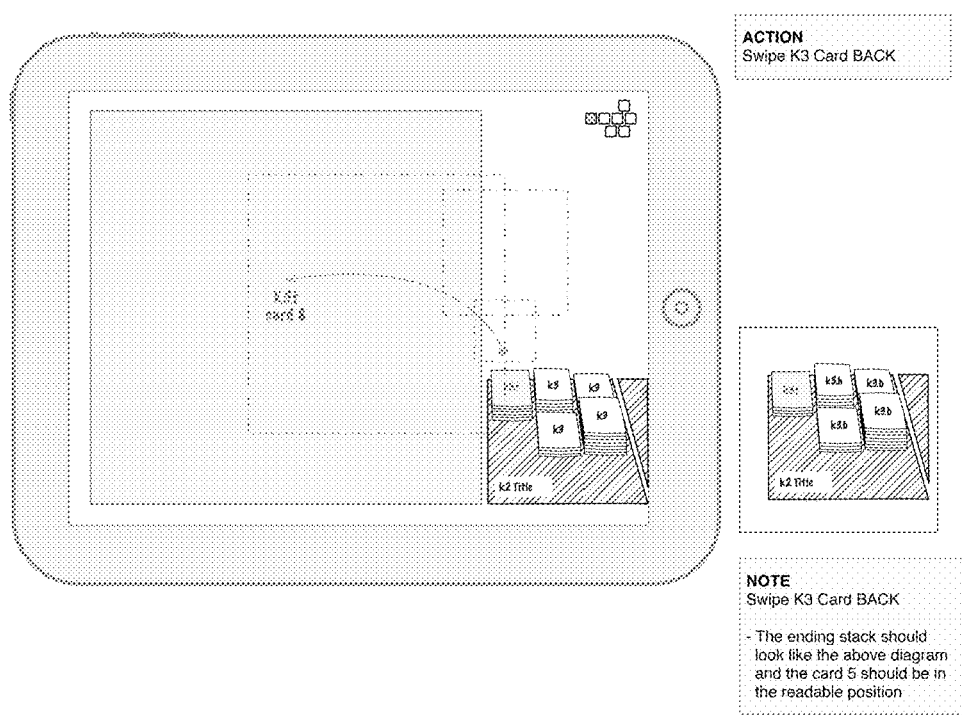
Figure 20:
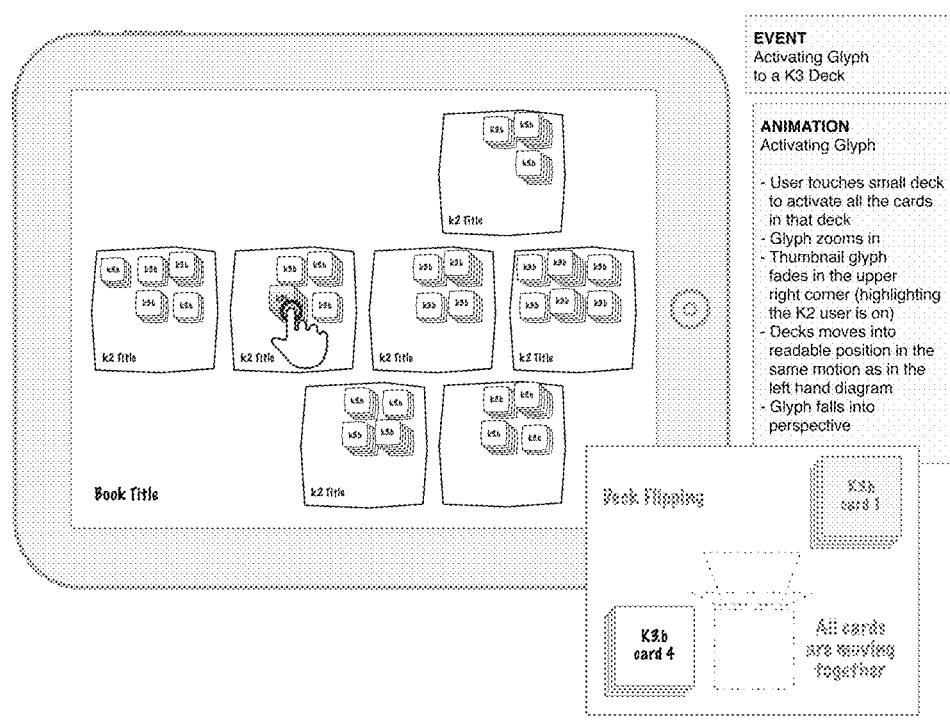
Figure 21:
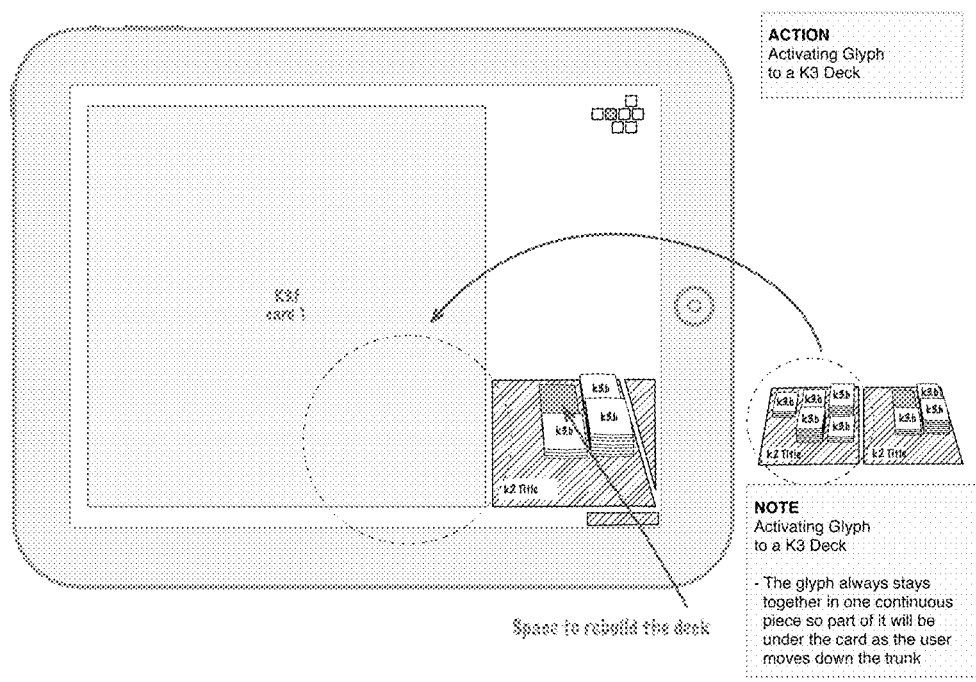
Figure 22:
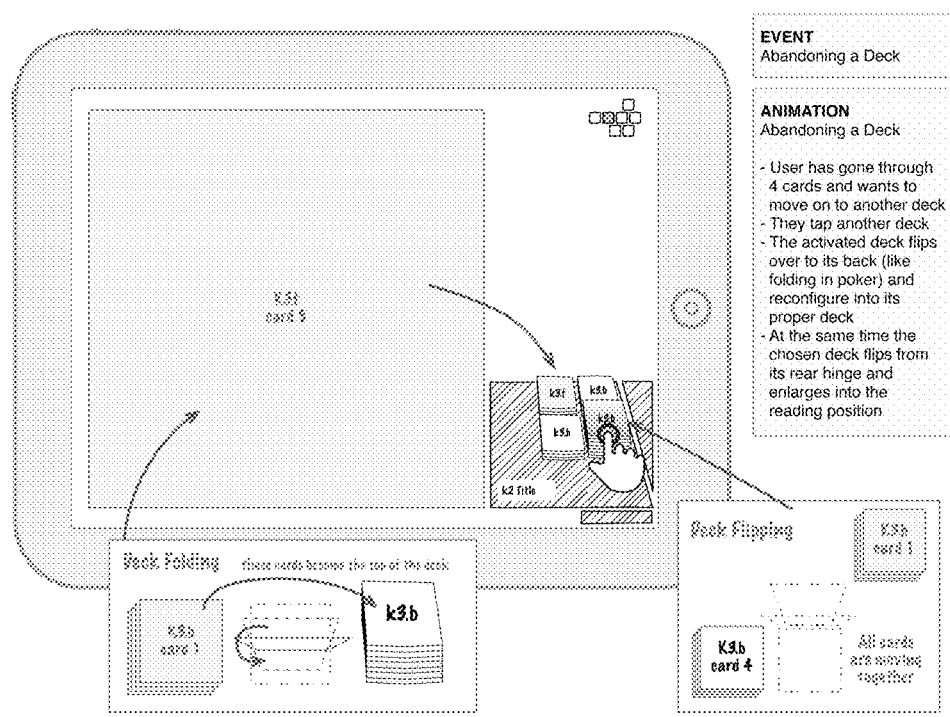
Figure 23:
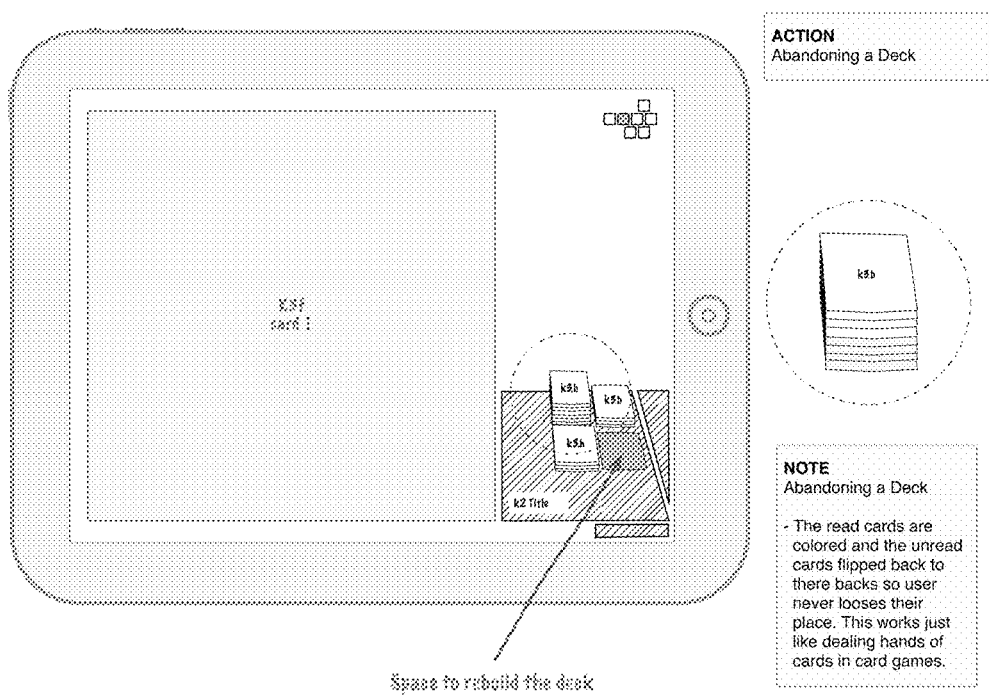
Figure 24:
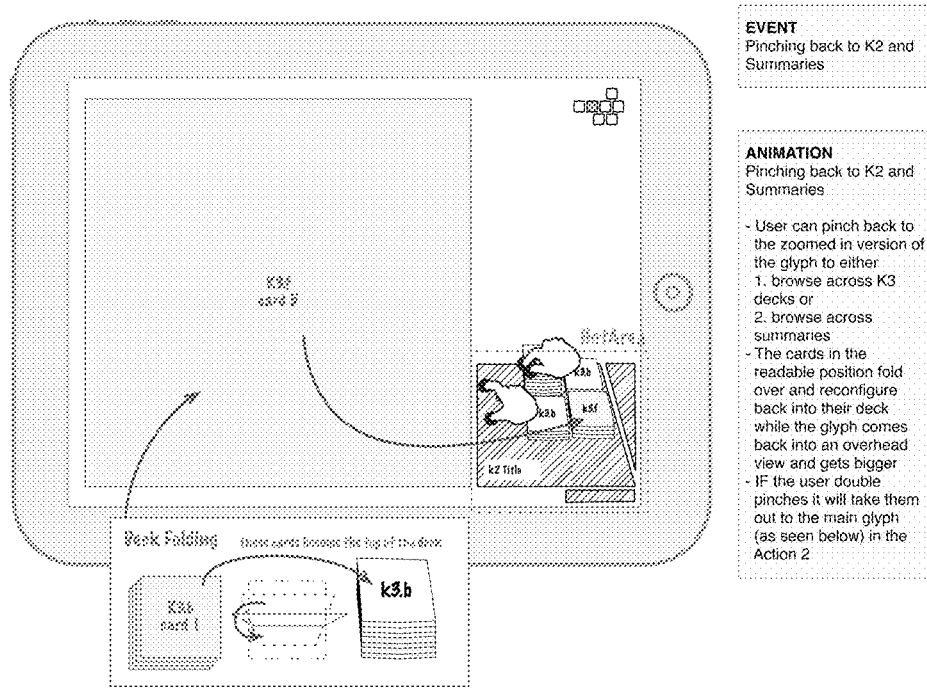
Figure 25:
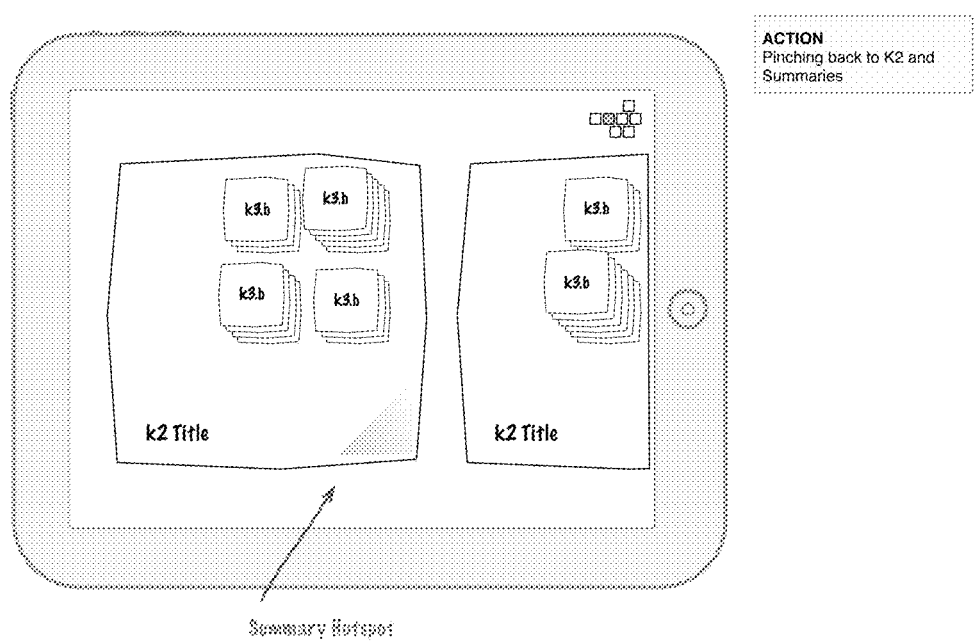
Figure 26:
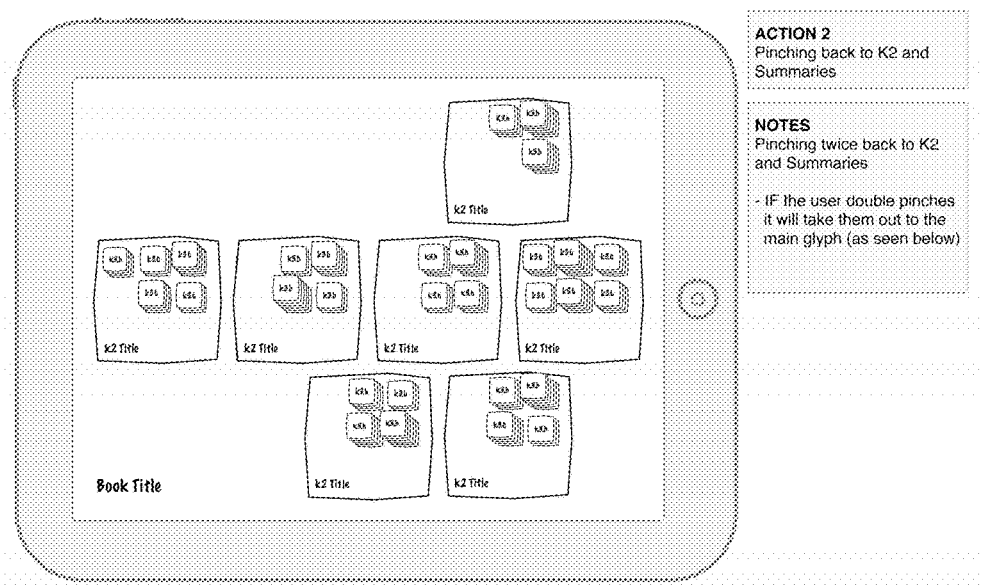
Figure 27:
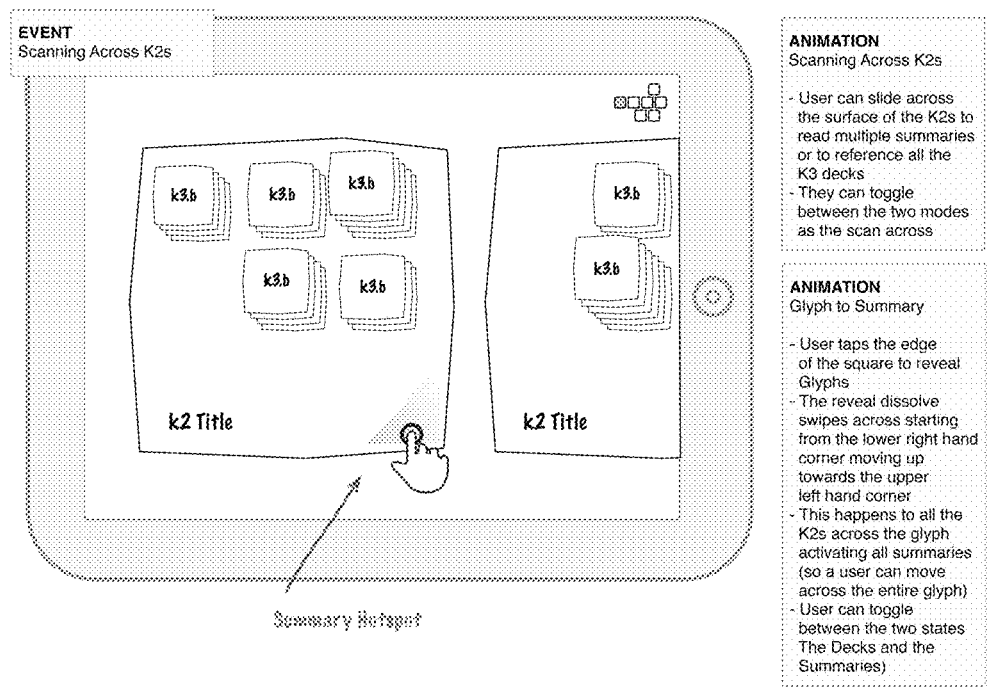
Figure 28:
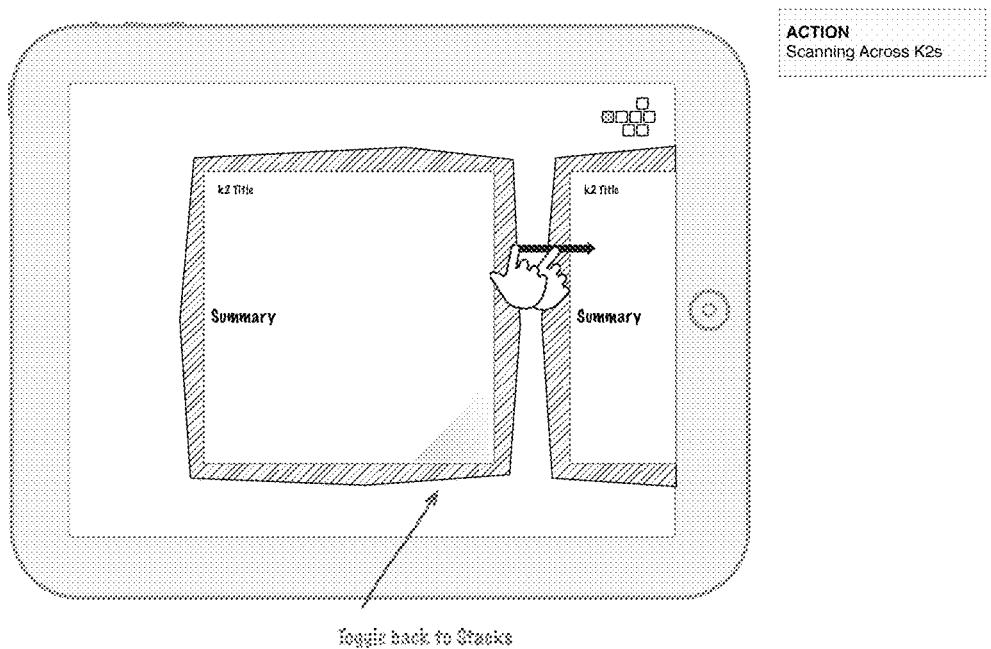
Figure 29:
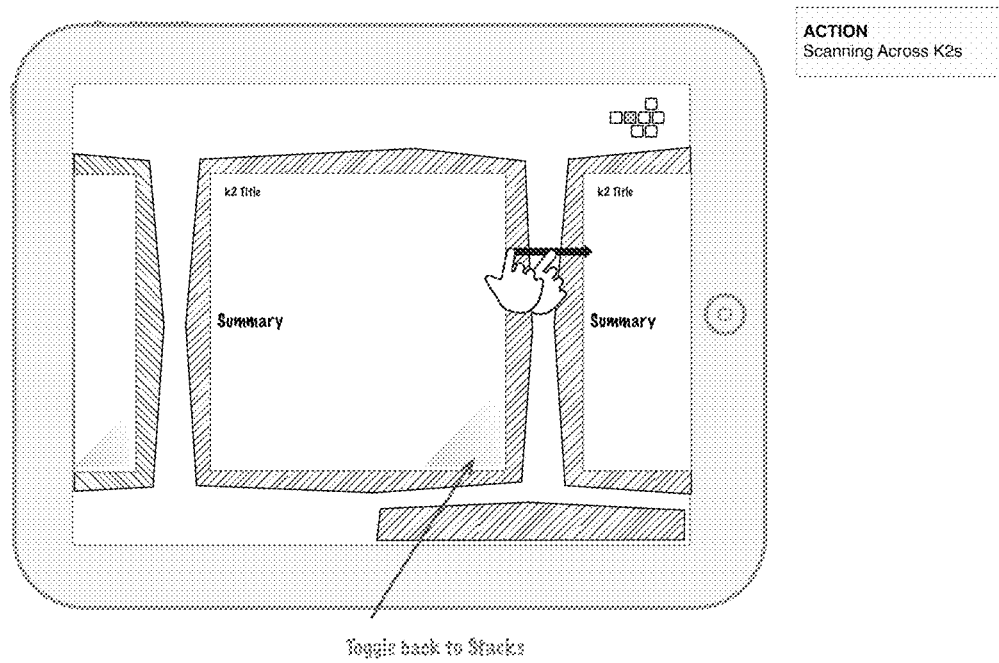
Figure 30:
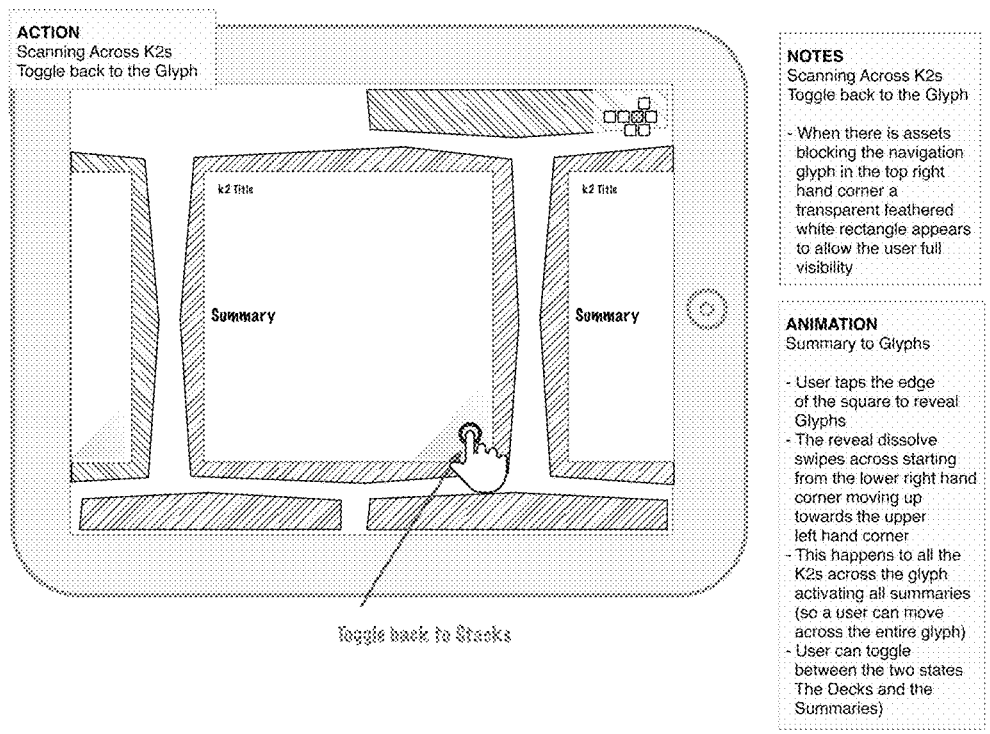
Figure 31:
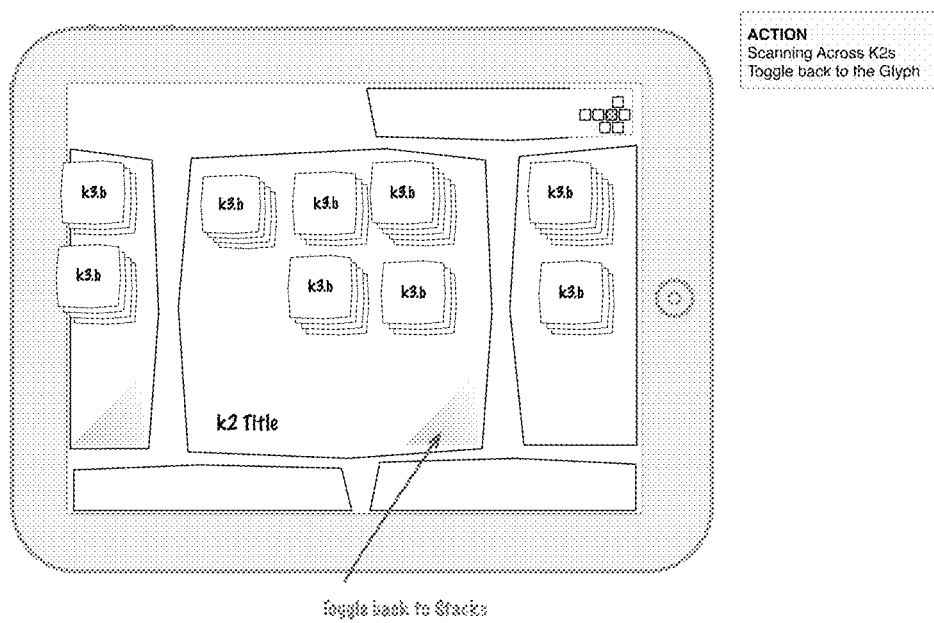

FIG. 7 illustrates one such example showing the cards arranged in a grid view. In various embodiments the grid view may show, without limitation, any combination of the following: all of the cards in sequential order, unread cards, read cards, only cards that contain video, cards that have been sent or shared, cards that have been saved, cards that have been marked as favorite, and the like. Those skilled in the art will appreciate that there are many other arrangements possible in a grid-view. Also, as will be appreciated, the grid view may be navigated by dragging or scrolling the display. And cards my be rearranged by simply touching a card or group of cards and dragging them to a new position.

No matter the type of view or arrangement of card, the cards and all of their elements are searchable. The searches may comprise any type of search, for example single word searches, boolean searches, structured searches, fuzzy searches, and so forth. The searching of data, no matter the platform and database structure, is well understood and implementing any desired search function and making it available to the user of the application is easily done by those having ordinary skill in the art.

As should be clear by now, the e-book is displayed on the screen of a computer such as an iPad or other mobile device, e-book reader, or tablet ("reader" or "device"). A user of the reader can interact with the content such as by touching the screen of the mobile device, moving the device, making gestures, and so forth. Through these and other interactions, additional content is displayed and the content may further be reorganized and condensed.

Figure 32:
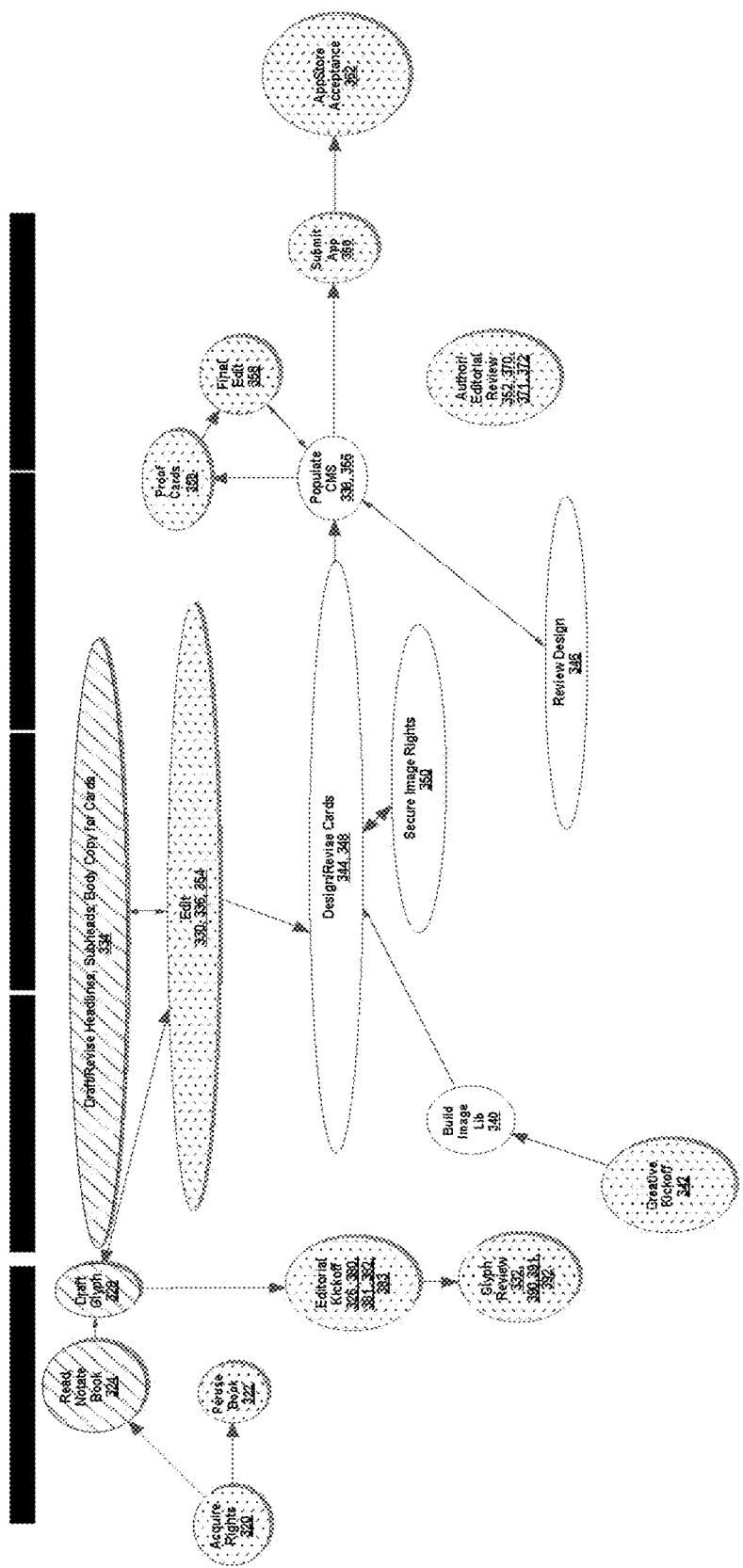
FIG. 32 illustrates a method for reorganizing and condensing an existing book having the hierarchical card structure
Figure 33:
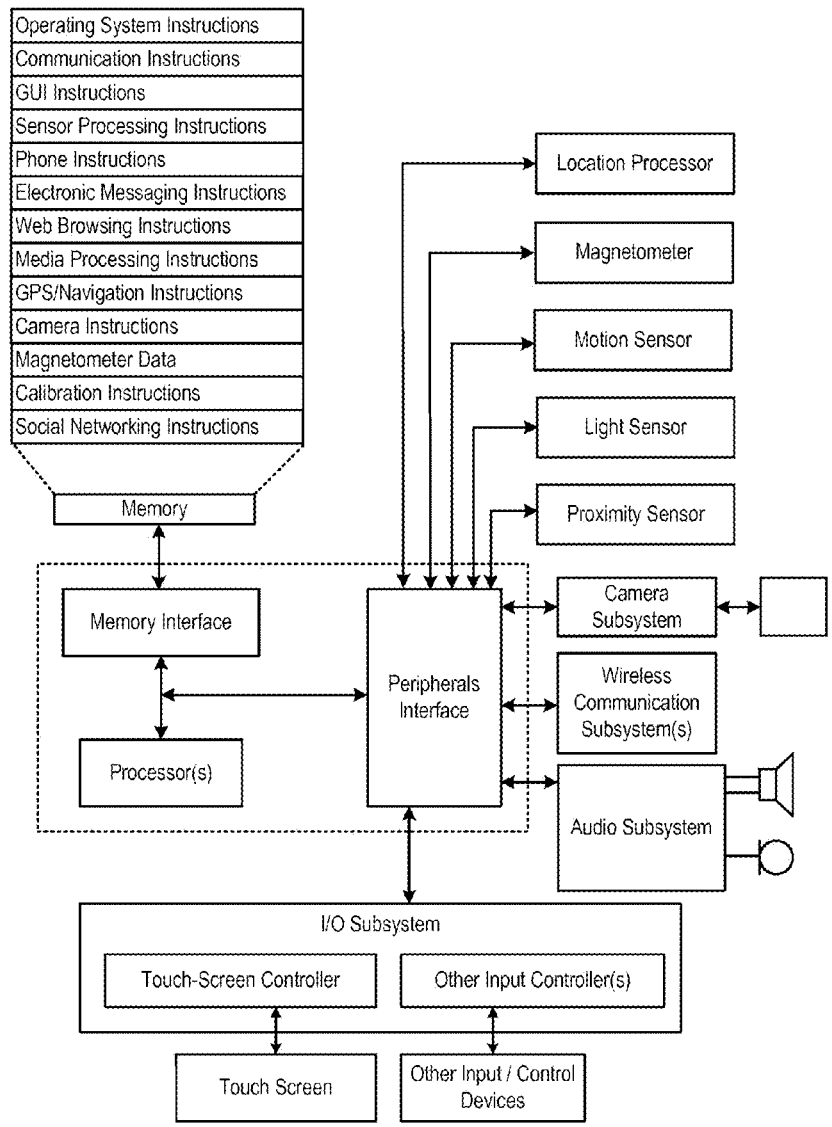
FIG. 33 is an illustration of the elements of an exemplary mobile device or computer.

FIG. 32 is a system diagram of an exemplary reader. More generally, FIG. 32 in part or in whole is a system diagram of a computer, such as a desktop computer, laptop computer, mobile electronic device, and the like.

The user interacts with the content by way of a sensor or sensors including but not limited to a touch screen, a mechanical button or keypad, an electronic button, a proximity sensor, a motion sensor, a light sensor, a magnetometer. These and other sensors are illustrated in FIG. 32. Exemplary actions include but are not limited to drag to the left to see the previous card, swipe to the right to see the next card, drag up or down to flip a card, tap a deck to go back, tap icons to share card via email, facebook, twitter, or by any other electronic means.

FIGS. 8-31 illustrate exemplary interactions with on an iPad or other touch sensitive tablet device. Each figure includes notes and other explicative information and graphics describing the event/user interaction and the resulting animation. It is appreciated by those having ordinary skill in the art that other actions are possible.

One of the actions of a user interaction includes "flipping" a card over from the "front" of the card comprising creative content and/or commentary, to the "back" of the card. The back of the card may comprise sales information about the book and means for purchasing the book or content, such as by way of amazon.com, a publisher's e-commerce site, and the like. The purchase may be automatic (e.g. by linking a user's amazon.com account to the mobile application disclosed herein) so that the user remains within the user interface disclosed herein.

The book, including any individual card or groups of cards may, comprise information gathered from a plurality of books, websites, editors' comments and analyses, readers' comments and analyses, or other sources. As such the electronic card-based book comprises a combination of information from the prior art book combined with additional commentary, analysis, and other information, multimedia elements, and the like.

FIG. 32 illustrates a method for reorganizing and condensing an existing book having the hierarchical card structure. At step 320 the publisher approves conversion of the book into the hierarchical card-based format. At step 322 the editor read the book and takes notes. At step 324 and potentially concurrent with step 322, the writer reads the book and takes notes.

Next, step 326 begins the author editor kickoff. Within step 326, the following steps are executed. At step 380, the author is interviewed by the company or person in managing the conversion of the book (hereinafter referred to as "SL"). At step 381 the initial idea is presented by SL. At step 382 the author and editor validate the initial ideas. At step 383 information from the kickoff is consolidated so SL is ready to create glyphs.

Next, at step 328 the writer writes glyphs and at step 330 the editor edits glyphs. Steps 328 and 330 may be repeated as the editor and writer collaborate. Then at step 332 is the author and editor glyph review.

The author/editor glyph review 332 comprises the steps of SL presenting the initial glyph 390, the author and editor reviewing the initial glyph 391, and SL ending the review ready to write the glyphs 392.

At step 334, draft cards, headlines, body copy, and additional media are submitted to a content management system (CMS) to be disclosed below. At step 336 the drafts are edited. The steps of 334 and 336 may be repeated, resulting in the drafts in the CMS.

A related but somewhat independent process communicates with the the CMS step of 338. The process comprises a creative kickoff 342 with an art director, photo editor, and other. At step 340 an image library is built and the title is designed at step 344. Steps 340 and 344 may be repeated. Once the images and title are ready, the are included in the CMS at the aforementioned step 338.

After step 338, there is a step of the a creative review 346 in which the editor, art director, photo editor, and project manager participate. The design is revised at step 348 which communicates back and forth with obtaining additional images and securing rights to those images. When the design has completed the revision process, the CMS is populated.

Referring back to the step of editing the draft 336, the next step comprises the author/editor draft review 352. The review 252 comprises the steps of SL transmitting the final draft 370. The draft may be electronically transmitted. When received, the author and editor review the final draft 371. Then the author/editor aggregates comments 370.

Following the step of 252, the copy is finalized 354 and the the CMS is populated 356. Following that, the final draft proofed 358. The final draft is then electronically transmitted to an appstore 360. Finally, the book is accepted by the appstore 263 and ready for purchase.

An appstore is a website comprising applications that can be downloaded and executed on a mobile device. One example of an appstore is Apple Computer's AppStore which offers mobile applications for device such as their iPhone, iPad, and so forth. Another example is an appstore for Android-based mobile devices such as Google's Play which offers applications and media for Android-based devices. Yet another example is any site enabled for e-commerce.

As should now be evident, books are reorganized and condensed in a hierarchical card-based format. A book is represented by the symbol K1. A visual representation of the book, also referred to as a full glyph view (FGV), provides a quick but comprehensive snapshot of what the book is about (FIG. 2).

A primary idea is represented by the symbol K2. The book (K1) comprises a plurality of primary ideas (K2) (See FIG. 2).

A supporting idea of a primary idea (K2) is represented by the symbol K3. Each supporting idea comprises a plurality of cards (see FIGS. 2-4)

A card of a supporting idea is represented by the symbol K4 (FIG. 4). A card comprises content such as text, images, video, audio, and other multimedia elements that can be rendered on the display of a computer. A card further comprises at least two sides, a front side $K4_F$ and a back side $K4_B$.

More succinctly, books, primary ideas, supporting ideas, and cards can be mathematically represented as follows, $$K4 \in K3 \in K2 \in K1$$

Furthermore, in practical terms, there are a plurality of books or titles. A collection of books is represented by the symbol K0 such that $K0=\{Book_1, Book_2, Book_3 \ldots \}$. Therefore, $$K4 \in K3 \in K2 \in K1 \in K0$$

Stated differently using somewhat less mathematic terminology,

K0 represents a set of books. K1.1 represents the first book, K1.2 represents the second book number, K1.3 represents the third book, and so forth.

Figure 41:
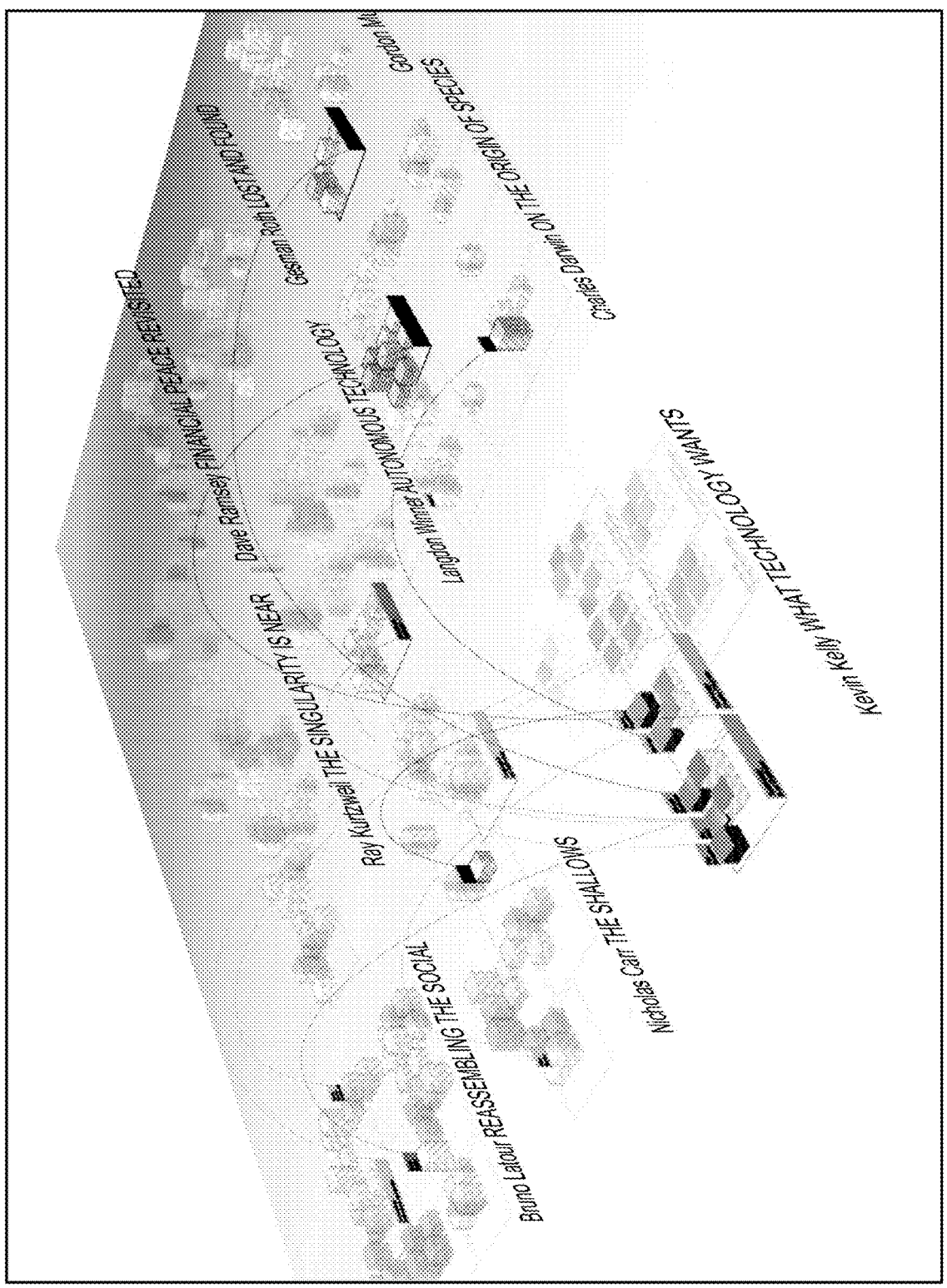
FIG. 41 shows a full glyph perspective view including connections among and between ideas in a plurality of books.

FIG. 41 shows a full glyph perspective view comprising primary ideas and supporting ideas, as discussed above. However FIG. 41 includes cards and connections between primary and supporting ideas found in a multiplicity of books. In other words, by reconstructing a multiplicity of books as disclosed herein, connections are made between and among ideas resulting in a truly original and novel e-book.

Examining an individual book, for example the first book (represented more succinctly as K1.1), it can be broken down into a set of primary ideas (more succinctly written as K2). The first primary idea is represented by K2.1, the second primary idea by K2.2, and so forth.

Examining an individual idea, for example the first idea (K2.1), it can be broken down into a set of supporting ideas (more succinctly written as K3). The first supporting idea is represented by K3.1, the second supporting idea by K3.2, and so forth.

Examining an individual supporting idea, for example the first supporting idea (K3.1), it can be broken down into a set of cards (more succinctly written as K4). Each card may have at least two sides, a front side and a back side (more succinctly written as $K4_F$ and $K4_B$, respectively).

Figure 35:
FIGS. 35-40 illustrate various aspects by way of screenshots of a content management system for reorganizing a book in hierarchically.
Figure 36:
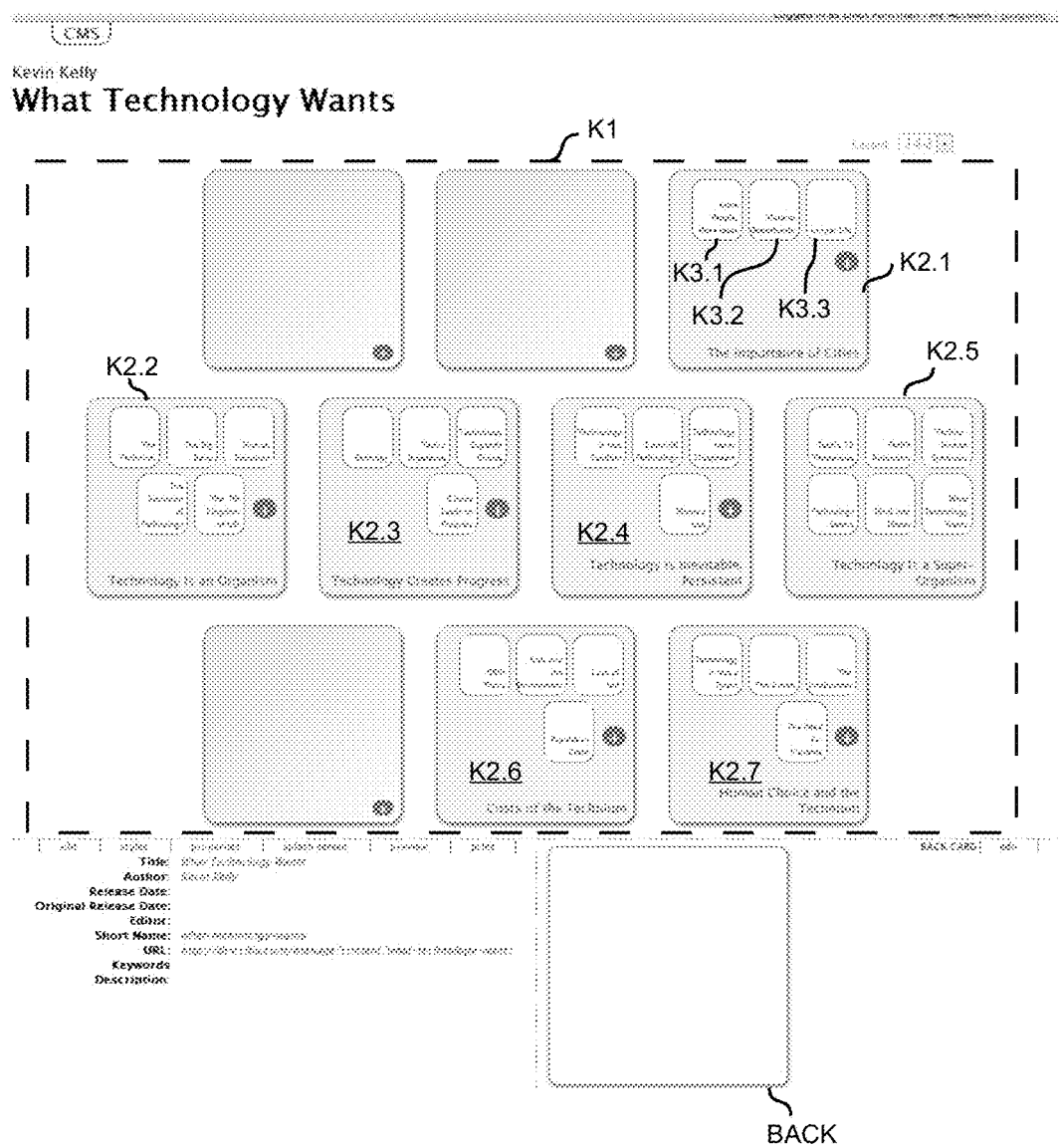

The above hierarchical description and CMS mentioned above is illustrated in FIGS. 35-40. FIG. 35 illustrates a KO view and its elements as shown in the CMS. FIG. 36 illustrates a K1 detailed view and its elements as shown in the the CMS. FIG. 36 also includes buttons "edit", "styles", "properties", "splash screen", "preview", "print", and an additional "edit" to edit the "BACK CARD". Also included on the page is the Title, Author, Release Date, Original Release Date, Editor, Short Name, URL, Keywords, and Descriptions. FIG. 36 also shows a dropdown box to select the layout which in this example is "3-4-3" gives a layout of ten K2s, arranged as three K2s with four K2s below that and with 3 K2s below that. Any other arrangement is possible and "3-4-3" is provided merely as an example.

In one embodiment, every element of the sets K0, K1, K2, K3, and K4 has permalink and may further be a shortened link. The link may be created as a function of many thinks such as the device for the element was created, the time of creation or modification, and so forth. Permalinks and link shortening are well understood and by those having ordinary skill in the art.

Figure 37:
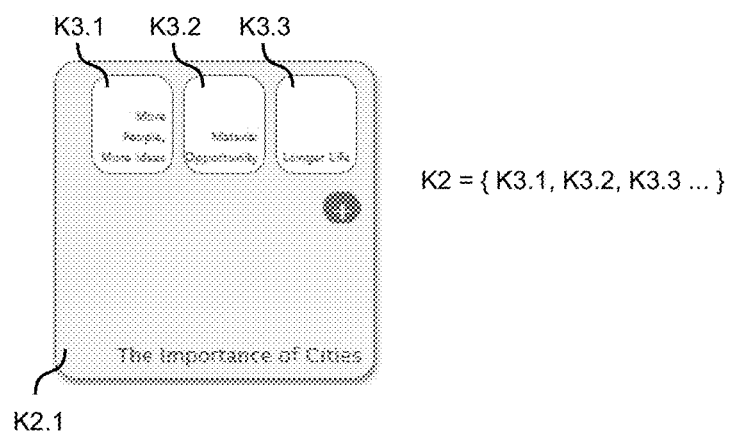
Figure 38:
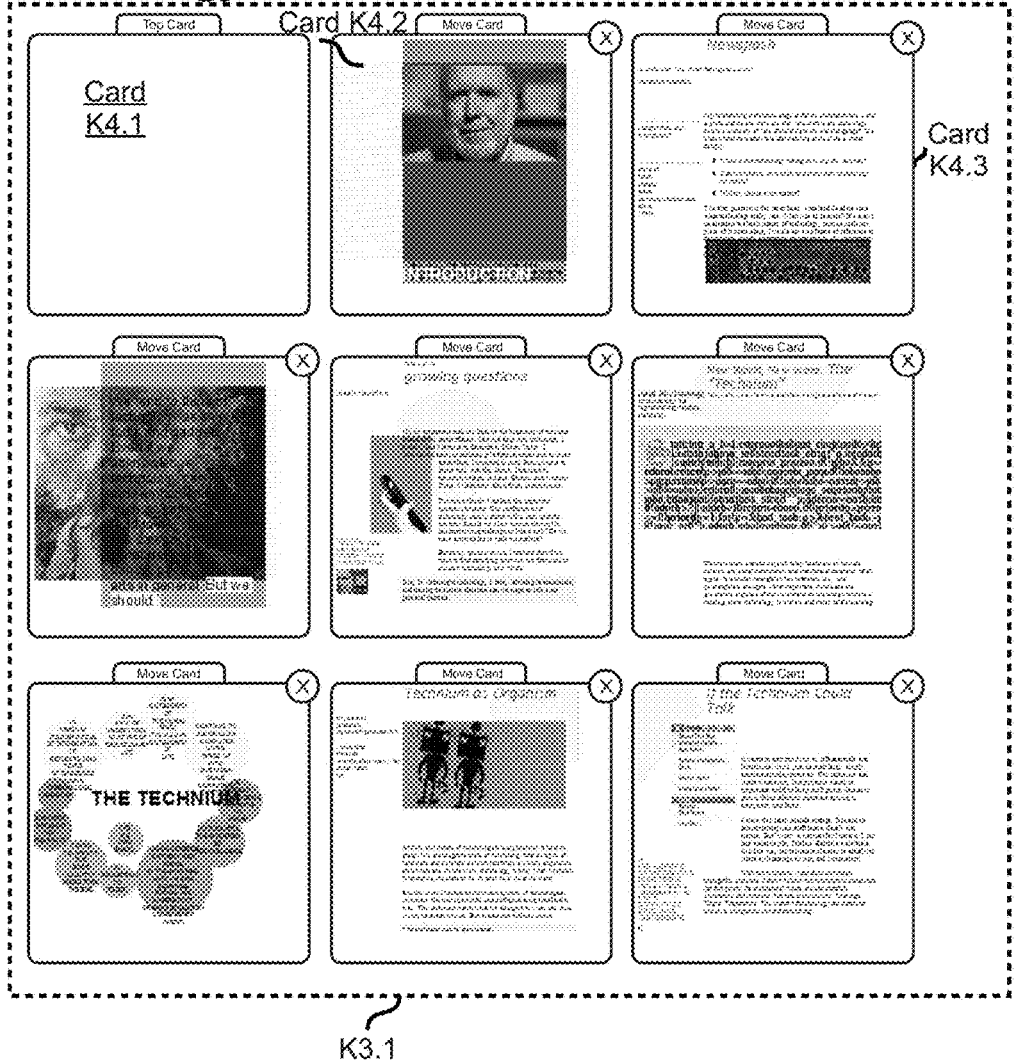
Figure 39:
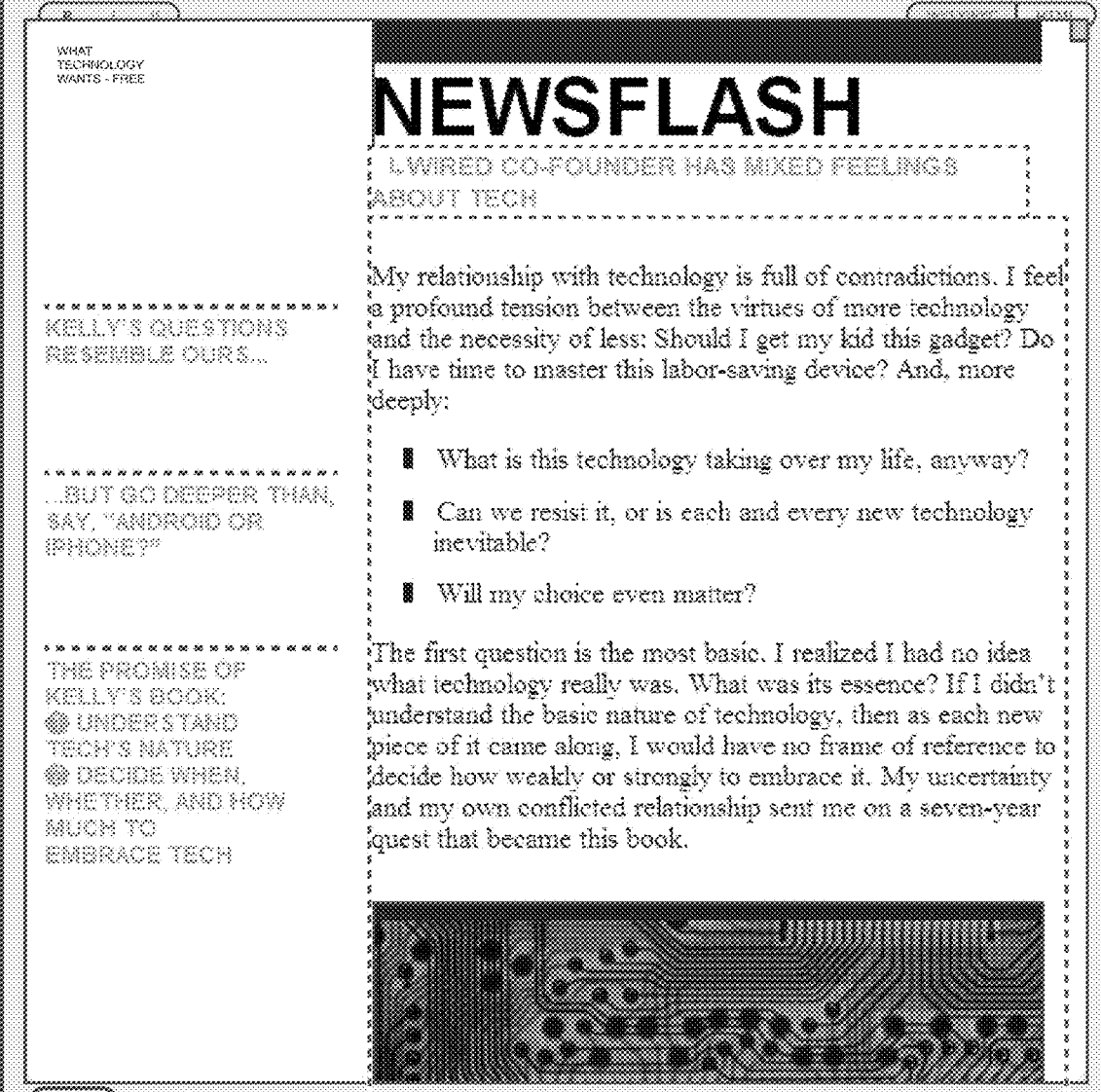
Figure 40:
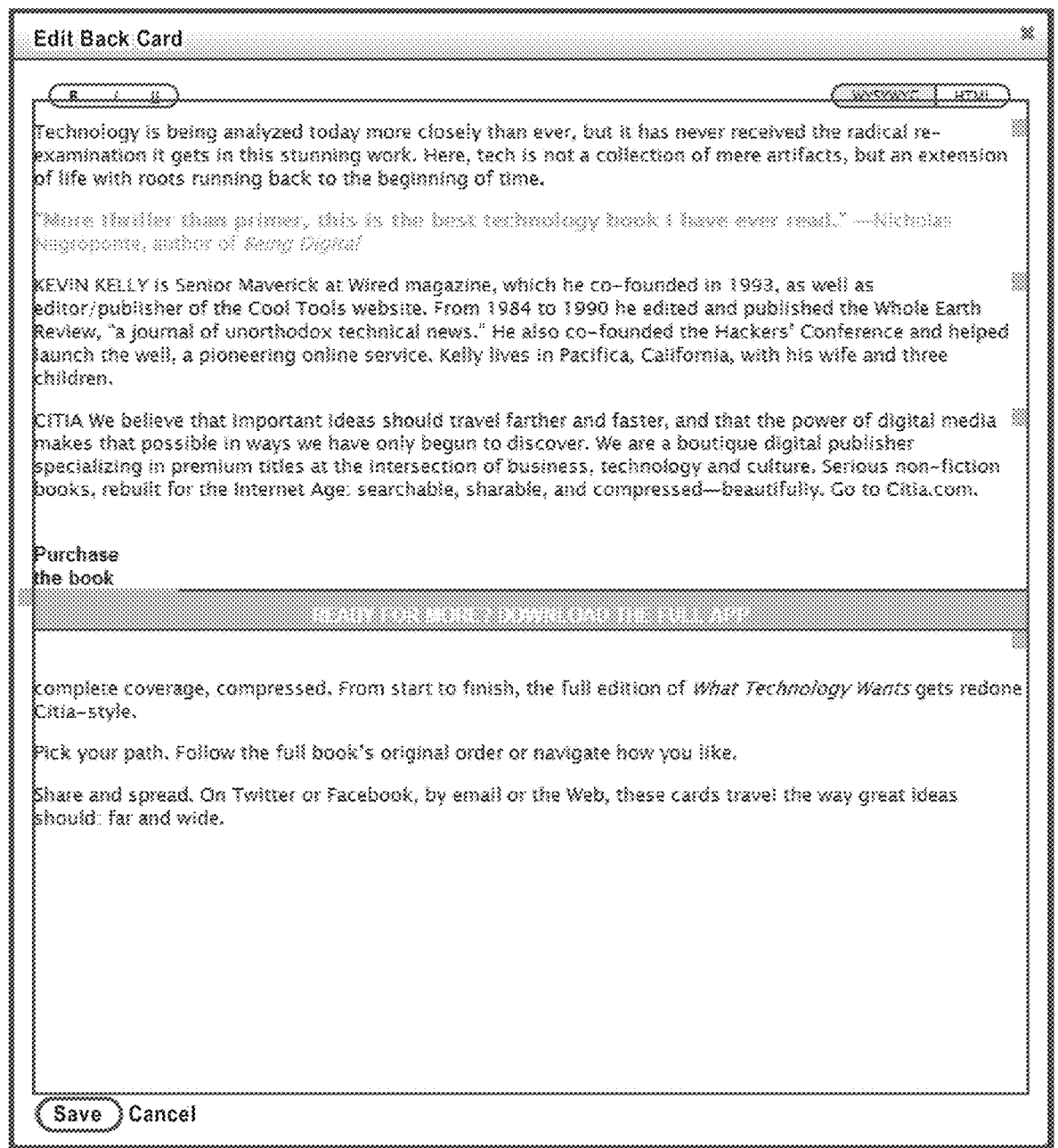

FIG. 37 illustrates a K2 detailed view comprising a plurality of supporting ideas K3 as shown in the CMS. FIG. 38 shows a K3 detailed view comprising a plurality of cards K4. FIG. 38 illustrates the front of an exemplary card being edited. FIG. 39 illustrates the back of a card being edited. Each side of the card has content. Exemplary content includes verbatim paragraphs or sections of the book, images, video, audio, and an other type of media that can be played, displayed, or interacted with via a mobile computing device. Additional exemplary content includes computer executable code which when executed by the processor of the computing device causes a process to execute. One example is a "Buy Now" icon that when touched by the user of the computer, causes the a full copy of the book from which the card's content was copied to be purchased. Other examples include any number of widgets or applets available to those having ordinary skill in the art.

As was disclosed above, the user interacts with the e-book by touching, tapping, and swiping the screen with one or more fingers. The mobile computing device may be configured so that an accelerometer of the device is employed to detect particular motions of the device made by the user, and translate those movements into user interaction commands, such as those made by touching the screen. Similarly, user interactions may include voice commands. Furthermore, user interactions may include facial expressions and body movements made by the user. These expressions and movements may be detected by a camera or other light sensitive device (in the visible spectrum or in any non-visible part of the electromagnetic spectrum) of the mobile computing device and translated into user interaction commands for interacting with the information displayed on the screen.

In one example, an electronic lenticular image is generated and displayed on a conventional display of a computing device. The image changes depending on the angle at which the user views the image. To accomplish this, the motion sensor or other sensors, alone and in combination detect directional acceleration and transitions the image from one to another. So, a user need only tilt their mobile device and the image will automatically change (and change back to its original I the user tilts the device in the direction from which it originated.

At a server (e.g 34 of FIG. 34), content from a plurality of publications is analyzed and made modular. The content of each publication is analyzed such as through computational linguistic analysis and entity extraction. The analysis identifies underlying structures and relationships within each publication and makes content modules that can be published independently of the publication.

The modular content may comprise text, images, video, entities, concepts, ideas, and the like which are stored in a relational database. The ideas, for example, are stored as objects. In this way, a plurality of publications can be stored in the database in an organized format that allows relationships between objects and modules to be discovered, queried, and republished. The fields in the database may include publication source, if the publication is internal or external, geography information which may be different among modules or objects, chapter information, tags, relevancy scores or ratings, author, publisher, copyright information, and the like.

Other types of analysis include any computation linguistic method known in the art. Additional analysis includes, but is not limited to argument mapping, concept mapping, information quantification, clustering algorithms, sentiment analysis, natural language processing, contextual analysis and mapping, syntactic analysis, analysis of grammatical structure, sentence diagramming, text parsing, content mapping and diagramming, and logic diagramming.

At least some of the objects and modules are republished (for example mashed up) and displayed on an electronic device such as a mobile computing device or a computer, for example an iPad or Android tablet, a smartphone, or any other computing device having a display and operable to communicate over a network such as the internet or any wired or wireless network, alone and in combination.

In this way, a republication is made that includes relevant ideas and information that is not necessarily tied to a particular publication and also includes content of related ideas that are likely of interested to the user. Furthermore, the republished content retains the flow and readability that is found in and expected of a single book or publication.

As the publications and the modules and objects may have different authors or copyright owners, the systems and methods additionally track royalty or other payment obligations due as a result of any republication. Furthermore, the systems and methods may include electronic interfaces with publishers for the automatic payment of any obligations.

It is appreciated that the mobile devices mentioned herein may comprise many different types of devices such as cell phones, smart phones, PDAs, portable computers, and any other type of device operable to transmit and receive electronic messages. The computer network(s) may include the internet and wireless networks such as a mobile phone network. Computers disclosed herein may be one or more computers and may comprise any type of computer capable of storing computer executable code and executing the computer executable code on a microprocessor, and communicating with the communication network(s). For example, a computer may be a web server. References to user identifiers may include electronic identifiers such as email addresses, mobile phone numbers, user IDs for instant messaging services, user IDs for social networking application, user IDs and URLs for blogs and micro-blogs, URIs, and the like.

The previously disclosed content management system provides maximum flexibility for editorial and SEO departments. It allows editors to create book-specific maps that serve as the navigation tool for each title. Users can see the map of the book, select the ideas laid out there, and enter/read according to their interests. Editors working in the CMS can use it to plot the constellation of chapters and sub-chapters that reflects each book's underlying structure. Each sub-chapter can be labeled and built on top of each chapter as a series of our unique digital "cards," which hold our content. Editors can write into the card templates, edit there, add rich media elements, and view the content either as WYSIWYG or HTML. Each card exists as a unique digital object, so SEO specialists can optimize each card's specific metadata.

In one example, publishers use the CMS to convert books for electronic publication. The publishers may pay a licensing fee for use of the CMS and associated methods and systems. Other exemplary uses and/or revenue generating uses include:

1. User generated content. Users can create and share cards. User may be charged a fee for the CMS and publishing system.
2. Advertising integration.
3. Sponsorship integration.
4. Subscriptions to content such as news and the like.
5. The CMS may be used for research and data mining.
6. Affiliate marketing uses.
7. Selling content created in-house and receiving mobile purchases of content.
8. Location bases apps that, for example, provide location relevant content.
9. Subscriptions
10. "White label" uses wherein the systems and methods are licenses to publishers and writers.
11. On-line magazines including online sales and advertising.
12. Use of the CMS data for search optimization
13. Paid ranking for search results.
14. Live conference e-books with content submitted and published live during the conference and content added or edited after the conference has ended, including content such as comments by users.
15. Users can mark cards as favorites which are stored in a workspace. Other users are granted access to the workspace and all collaborate on creating an e-book. The e-book may never be finished in that it is always being edited and added to.

It is also noted that the CMS disclosed herein is a multi-user and distributed in that multiple people and organizations may use it and collaborate for the purpose of creating a title. As such the CMS includes user policy and permission settings that may be configured in any number of ways. For example, an author may include any individual—even a non-professional writer—who desires to create an electronic book on any subject and for any reason. In this example, the writer may grant permission for his/her friends or colleagues to access the CMS in an editorial capacity. With this in mind, it is now understood that any use of the terms writer, author, editor, and designer herein is a designation that can be granted to any person within the context of the CMS; the terms are not reserved and are not used solely for people that are formally trained as a writer, author, editor, or designer, or for those who perform those functions as part of their profession.

The methods and systems may be implemented on any computer communicating over any network. For example the computers may include desktop computers, tablets, handheld devices, laptops and mobile devices. The mobile devices may comprise many different types of mobile devices such as cell phones, smart phones, PDAs, portable computers, tablets, and any other type of mobile device operable to transmit and receive electronic messages. One exemplary device is a tablet computer such as an iPad.

Figure 34:
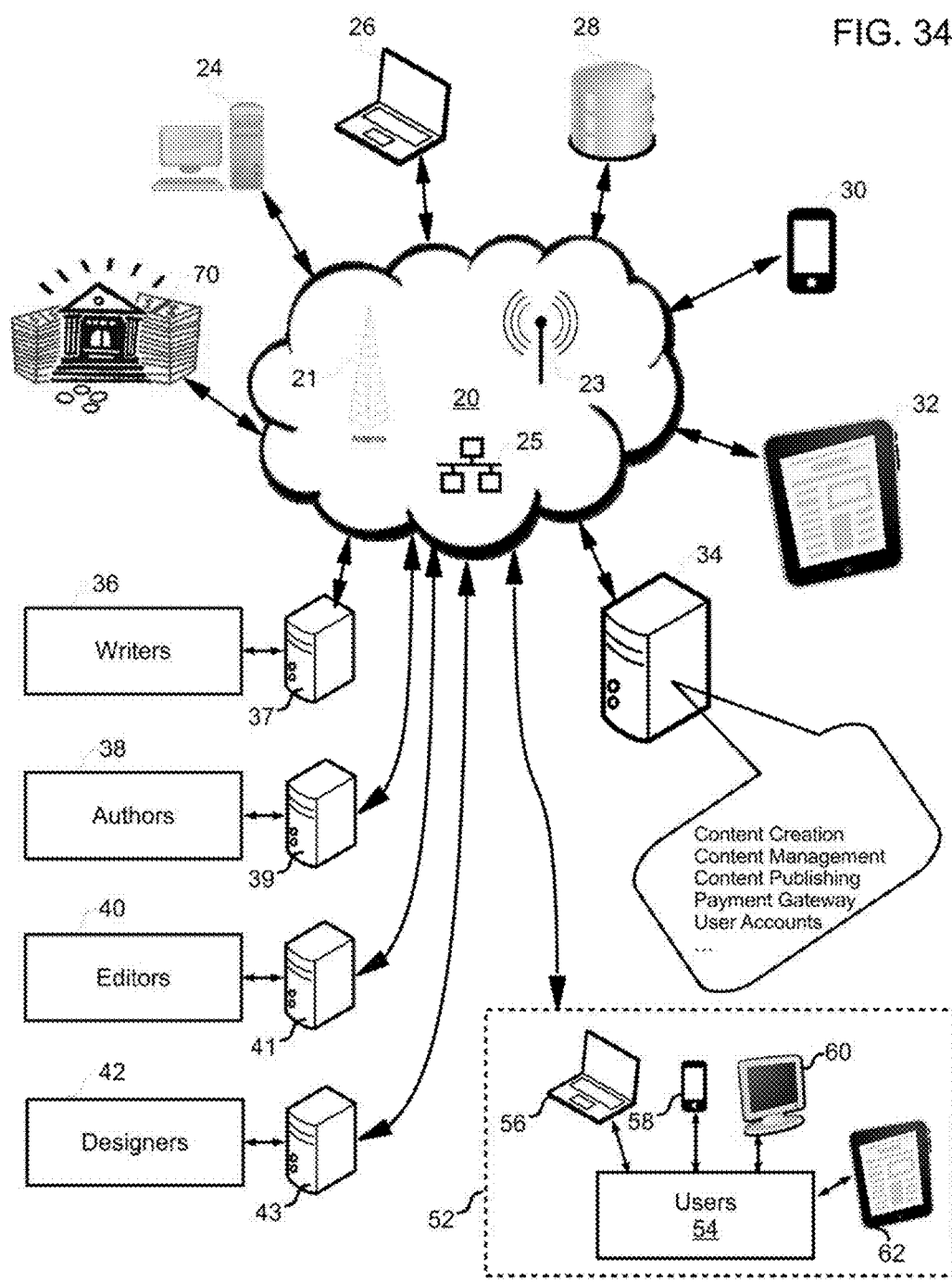
FIG. 34 illustrates a system for content creation and publication.

With all of the above disclosure in mind, FIG. 34 illustrates a system for interactive mobile content creation and publishing. Writers 36, authors 38, editors 40, designers 42 are in communication with each other and their communication coordinated by SL its server 34 which also includes a CMS. Users 52 are can download and view books by way of their network accessible device such as laptop computer 56, smart phone 58, desktop computer 60, and tablet computer 62. A bank 70 may also be in communication with server 34 and./or users 52 to facilitate book purchases. Other users m24, 26, 30, and 32 may also be in communication by way of the network. The CMS and those accessing it may be in communication with any number of databases 28 which may reside locally to any of the server 34, 37, 39, 41, 43 or may be accessible via network 20. For example the database may contain current news items or information about subjects in in the e-book.

The network(s) 20 may include the internet and wireless networks such as a mobile phone network and WiFi networks 21,23 and wired networks 25 and subnetworks.

Any reference to a "computer" is understood to include one or more computers operable to communicate with each other. Computers and devices comprise any type of computer capable of storing computer executable code and executing the computer executable code on a microprocessor, and communicating with the communication network (s). For example computer may be a web server.

References to electronic identifiers may be used which include, but are not limited to, email addresses, mobile phone numbers, user IDs for instant messaging services, user IDs for social networking application or mobile applications, user IDs and URLs for blogs and micro-blogs, URIs, bank account or financial institution numbers, routing numbers, credit and debit cards, any computer readable code, and other electronic identifiers to identify accounts, users, companies, and the like.

The systems and methods may be implemented on an Intel or Intel compatible based computer running a version of the Linux operating system or running a version of Microsoft Windows, Apple OS, and other operating systems. Computing devices based on non-Intel processors, such as ARM devices may be used. Various functions of any server, mobile device or, generally, computer may be implemented in hardware and/or in software, including in one or more signal processing and/or application specific integrated circuits.

The computers and, equivalently, mobile devices may include any and all components of a computer such as storage like memory and magnetic storage, interfaces like network interfaces, and microprocessors. For example, a computer comprises some of all of the following: a processor in communication with a memory interface (which may be included as part of the processor package) and in communication with a peripheral interface (which may also be included as part of the processor package); the memory interface is in communication via one or more buses with a memory (which may be included, in whole or in part, as part of the processor package; the peripheral interface is in communication via one or more buses with an input/output (I/O) subsystem; the I/O subsystem may include, for example, a graphic processor or subsystem in communication with a display such as an LCD display, a touch screen controller in communication with a touch sensitive flat screen display (for example, having one or more display components such as LEDs and LCDs including sub-types of LCDS such as IPS, AMOLED, S-IPS, FFS, and any other type of LCD; the I/O subsystem may include other controllers for other I/O devices such as a keyboard; the peripheral interface may be in communication with either directly or by way of the I/O subsystem with a storage controller in communication with a storage device such a hard drive, non-volatile memory, magnetic storage, optical storage, magneto-optical storage, and any other storage device capable of storing data; the peripheral interface may also be in communication via one or more buses with one or more of a location processor such as a GPS and/or radio triangulation system, a magnetometer, a motion sensor, a light sensor, a proximity sensor, a camera system, wireless communication subsystem(s), and audio subsystems.

A non-transitory computer readable medium, such as the memory and/or the storage device(s) includes/stores computer executable code which when executed by the processor of the computer causes computer to perform a series of steps, processes, or functions. The computer executable code may include, but is not limited to, operating system instructions, communication instruction, GUI (graphical user interface) instructions, sensor processing instructions, phone instructions, electronic messaging instructions, web browsing instructions, media processing instructions, GPS or navigation instructions, camera instructions, magnetometer instructions, calibration instructions, an social networking instructions.

An application programming interface (API) permits the systems and methods to operate with other software platforms such as Salesforce CRM, Google Apps, Facebook, Twitter, social networking sites, desktop and server software, web applications, mobile applications, and the like. For example, an interactive messaging system could interface with CRM software and Google Calendar.

A computer program product may include a non-transitory computer readable medium comprising computer readable code which when executed on the computer causes the computer to perform the methods described herein. Databases may comprise any conventional database such as an Oracle database or an SQL database. Multiple databases may be physically separate, logically separate, or combinations thereof.

The features described can be implemented in any digital electronic circuitry, with a combination of digital and analogy electronic circuitry, in computer hardware, firmware, software, or in combinations thereof. The features can be implemented in a computer program product tangibly embodied in an information carrier (such as a hard drive, solid state drive, flash memory, RAM, ROM, and the like), e.g., in a machine-readable storage device or in a propagated signal, for execution by a programmable processor; and method steps can be performed by a programmable processor executing a program of instructions to perform functions and methods of the described implementations by operating on input data and generating output(s).

The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any type of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. Some elements of a computer are a processor for executing instructions and one or more memories for storing instructions and data. Generally, a computer will also include, or communicate with one or more mass storage devices for storing data files. Exemplary devices include magnetic disks such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) for displaying information to the user and a keyboard and a pointing device such as a mouse or a trackball by which the user can provide input to the computer. The display may be touch sensitive so the user can provide input by touching the screen.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wired and wireless packetized networks, and the computers and networks forming the Internet.

The foregoing detailed description has discussed only a few of the many forms that this invention can take. It is intended that the foregoing detailed description be understood as an illustration of selected forms that the invention can take and not as a definition of the invention. It is only the claims, including all equivalents, that are intended to define the scope of this invention.

What is claimed is:

1. A method, comprising:
    receiving, at a server and from a content source, content source data including a discrete instance of digital content;
    performing, the server and after the receiving, linguistic analysis on the content source data to identify a representation of a semantic hierarchical relationship between unstructured portions from a plurality of unstructured portions of the discrete instance of digital content of the content source data, the semantic hierarchical relationship being previously unidentified before the performing;
    dividing, at the server and after the performing, the content source data into a plurality of modular data objects corresponding to a plurality of subsets of content as delineated by the semantic hierarchical relationship between the unstructured portions;
    generating, at the server and after the dividing, a representation of each content card from a plurality of content cards by including, in the representation of that content card, and from the plurality of modular data objects, a modular data object corresponding to a subset of content from the plurality of subsets of content;
    instantiating, at the server and after the generating, a modular content data structure including the plurality of content cards and content data metadata, the content data metadata indicating (1) the content source of the content source data in the plurality of content cards, and (2) for each content card of the plurality of content cards, an association with at least one remaining content card of the plurality of content cards based on the representation of the semantic hierarchical relationship; and
    sending, from the server and after the instantiating, a signal to a mobile communication device including a touch screen, the signal including computer executable code that, when executed by a processor at the mobile communication device, causes the modular content data structure to be displayed and navigated by way of the touch screen.

2. The method of claim 1, wherein the modular content data structure is displayed on the touch screen in a grid view.

3. The method of claim 1, wherein the content data structure metadata includes at least one identifier associated with the content source of the content source data in the content data structure.

4. The method of claim 1, wherein the signal is a first signal, the method further comprising:
    receiving a second signal from the mobile communication device, the second signal including instructions to send the modular content data structure to at least one of an email address or a social media account; and
    sending a third signal to the at least one of one of an email server or a social media server, the third signal including the modular content data structure and the content data metadata, including an identifier associated with the content source of the content source data in the content data structure.

5. The method of claim 1, wherein the modular content data structure includes at least one universal resource locator (URL) associated with at least a portion of the content source data included in the modular content data structure.

6. The method of claim 1, wherein each content card in the plurality of content cards is associated with a permalink.

7. The method of claim 1, wherein each content card in the plurality of content cards is associated with content card source metadata.

8. The method of claim 1, wherein the plurality of subsets of content is a first plurality of subsets of content, the plurality of content cards are a first plurality of content cards, the plurality of modular data objects is a first plurality of modular data objects, the modular content data structure is a first modular content data structure, the content data metadata is a first content data metadata, the representation is a first representation, the signal is a first signal, the method further comprising:
    dividing the content source data into a second plurality of modular data objects corresponding to a second plurality of subsets of content as delineated by the plurality of unstructured portions of the content source data;
    generating a second plurality of content cards by including, in the representation of that content card, and from the plurality of modular data objects, a modular data object corresponding to a subset of content from the plurality of subsets of content;
    instantiating a second modular content data structure including the second plurality of content cards and a second content data metadata, the second content data metadata indicating (A) the content source of the second content source data in the second plurality of content cards, and (B) for each content card of the second plurality of content cards, an association with at least one remaining content card of the second plurality of content cards based on the representation of the semantic hierarchical relationship; and sending a second signal to the mobile communication device, the second signal including computer executable code that, when executed by the processor at the mobile communication device, causes the second modular content data structure to be displayed and navigated by way of the touch screen.

9. The method of claim 8, wherein each content card from the first plurality of content cards differs from each content card from the second plurality of content cards.

10. The method of claim 8, wherein at least one content card from the first plurality of content cards corresponds to at least one content card from the second plurality of content cards.

11. The method of claim 1, wherein:
the signal including computer executable code that, when executed by the processor at the mobile communication device, causes the modular content data structure to be displayed in a plurality of stacks, each stack from the plurality of stacks including at least one content card from the plurality of content cards.

12. The method of claim 1, wherein:
the signal including computer executable code that, when executed by the processor at ef the mobile communication device, causes the modular content data structure to be displayed in a plurality of stacks, the plurality of stacks including a first stack that includes a first content card and a second content card from the plurality of content cards, at least one of the first content card or the second content card having a link indicating the order of display within the first stack.

13. A method, comprising:
receiving, at a server and from a content source, content source data from a content source including a discrete instance of digital content;
analyzing performing, at the server and after the receiving, linguistic analysis on the content source data to identify a representation of a semantic hierarchical relationship between unstructured portions from a plurality of unstructured portions of the discrete instance of digital content of the content source data, the semantic hierarchical relationship being previously unidentified before the performing;
dividing, at the server and after the performing, the content source data into a plurality of modular data objects corresponding to a plurality of subsets of content as delineated by the semantic hierarchical relationship between the unstructured portions;
generating, at the server and after the dividing, a representation of each content object from a plurality of content objects by including, in the representation of that content card, and from the plurality of modular data objects, a modular data object corresponding to a subset of content from the plurality of subsets of content;
instantiating, at the server and after the generating, a modular content data structure including the plurality of content objects and content data metadata, the content data metadata indicating (1) the content source of the content source data in the plurality of content objects, and (2) for each content object of the plurality of content objects, an association with at least one remaining content object of the plurality of content objects based on the representation of the semantic hierarchical relationship;
sending, from the server and after the instantiating, a first signal to a mobile communication device including a touch screen, the first signal including first computer executable code that, when executed by a processor at-ef the mobile communication device, causes the modular content data structure to be displayed and navigated by way of the touch screen;
receiving a signal from the mobile communication device indicating a modification to the plurality of content objects;
modifying an order of content objects in the ordered set of content objects based on the modification to the plurality of content objects so as to generate a modified modular content data structure; and
sending, from the server and after the modifying, a second signal to the mobile communication device, the second signal including second computer executable code that, when executed by the processor at the mobile communication device, causes the modified modular content data structure to be displayed at the touch screen.

14. A method comprising:
receiving, at a server and from a content source, content source data including a discrete instance of digital content;
performing, at the server and after the receiving, linguistic analysis on the content source data to identify a representation of semantic hierarchical relationship between unstructured portions from a plurality of unstructured portions of the discrete instance of digital content of the content source data, the semantic hierarchical relationship being previously unidentified before the performing;
dividing, at the server and after the performing, the content source data into a plurality of modular data objects corresponding to a plurality of subsets of content as delineated by the semantic hierarchical relationship between the unstructured portions;
generating, at the server and after the dividing, a representation of each content object from a plurality of content objects by including, in the representation of that content card, and from the plurality of modular data objects, a modular data object corresponding to a subset of content from the plurality of subsets of content;
instantiating, at the server and after the generating, a modular content data structure including the plurality of content objects and content data metadata, the content data metadata indicating (1) the content source of the content source data in the plurality of content objects, and (2) for each content object of the plurality of content objects, an association with at least one remaining content object of the plurality of content objects based on the representation of the semantic hierarchical relationship;
sending, from the server and after the instantiating, a signal to a mobile communication device including a touch screen, the signal including computer executable code that, when executed by a processor at the mobile communication device, causes the modular content data structure to be displayed and navigated by way of the touch screen; and sending, from the server and after the instantiating, a signal to an external server, the signal to the external server including the modular content data structure and the content data metadata, and further including instructions to embed the modular content data structure in a website hosted by the external server.

* * * * *

UNITED STATES PATENT AND TRADEMARK OFFICE
CERTIFICATE OF CORRECTION

PATENT NO.        : 10,739,932 B2
APPLICATION NO.   : 13/650102
DATED             : August 11, 2020
INVENTOR(S)       : Linda M. Holliday Page 1 of 2

It is certified that error appears in the above-identified patent and that said Letters Patent is hereby corrected as shown below:

In the Specification

Column 2, Line 40: "a a" should be --a--;

Column 3, Line 36: "the the" should be --the--;

Column 3, Line 42: "that that" should be --that--;

Column 3, Line 46: "have are" should be --are--;

Column 7, Line 21: "my" should be --may--;

Column 8, Line 41: "the the" should be --the--;

Column 8, Line 45: "the are" should be --they are--;

Column 8, Line 47: "the a" should be --the--;

Column 8, Line 60: "the the" should be --the--;

Column 9, Line 63: "KO" should be --K0--;

Column 9, Line 66: "the the" should be --the--;

Column 10, Line 23: "an other" should be --another--;

Column 10, Line 29: "the a" should be --a--;

Column 14, Line 37-38: "analogy" should be --analog--;

Signed and Sealed this
Twelfth Day of January, 2021

Andrei Iancu
*Director of the United States Patent and Trademark Office*

CERTIFICATE OF CORRECTION (continued)
U.S. Pat. No. 10,739,932 B2

In the Claims

Column 15, Line 51 (Claim 1): "the server" should be --at the server--;

Column 16, Line 24 (Claim 3): delete "structure";

Column 17, Line 41 (Claim 13): delete "from a content source";

Column 17, Line 43 (Claim 13): delete "analyzing";

Column 18, Line 10 (Claim 13): "at-ef" should be --at--.